United States Patent
Yamaoka et al.

(10) Patent No.: US 8,243,567 B2
(45) Date of Patent: Aug. 14, 2012

(54) OPTICAL DISC, PLAYBACK APPARATUS FOR OPTICAL DISC, AND APPARATUS AND METHOD FOR MANUFACTURING OPTICAL DISC

(75) Inventors: Masaru Yamaoka, Osaka (JP); Makoto Usui, Osaka (JP)

(73) Assignee: Panasonic Corporation, Osaka (JP)

( * ) Notice: Subject to any disclaimer, the term of this patent is extended or adjusted under 35 U.S.C. 154(b) by 122 days.

(21) Appl. No.: 12/810,911

(22) PCT Filed: Sep. 7, 2009

(86) PCT No.: PCT/JP2009/004413
§ 371 (c)(1),
(2), (4) Date: Jun. 28, 2010

(87) PCT Pub. No.: WO2010/052817
PCT Pub. Date: May 14, 2010

(65) Prior Publication Data
US 2010/0284253 A1    Nov. 11, 2010

(30) Foreign Application Priority Data
Nov. 4, 2008    (JP) .................................. 2008-282725

(51) Int. Cl.
*G11B 5/09*    (2006.01)
(52) U.S. Cl. ................. 369/47.21; 369/47.28; 369/53.2; 369/275.1
(58) Field of Classification Search ............... 369/47.21, 369/47.28, 53.2, 275.1; 264/447
See application file for complete search history.

(56) References Cited

U.S. PATENT DOCUMENTS

| | | | |
|---|---|---|---|
| 6,209,092 B1 | 3/2001 | Linnartz | |
| 6,219,322 B1 | 4/2001 | Kobayashi | |
| 6,665,240 B1 | 12/2003 | Kobayashi et al. | |
| 6,735,160 B1 | 5/2004 | Miyashita et al. | |
| 7,046,606 B2 * | 5/2006 | Takahashi et al. | ........... 369/53.2 |
| 7,102,989 B2 * | 9/2006 | Suh et al. | ................... 369/275.3 |

(Continued)

FOREIGN PATENT DOCUMENTS

JP    11-126426    5/1999

(Continued)

OTHER PUBLICATIONS

International Search Report issued Nov. 24, 2009 in International (PCT) Application No. PCT/JP2009/004413.

*Primary Examiner* — Wayne Young
*Assistant Examiner* — Brenda Bernardi
(74) *Attorney, Agent, or Firm* — Wenderoth, Lind & Ponack, L.L.P.

(57) ABSTRACT

Provided is an optical disc having main information to be decrypted using sub information recorded thereon by arranging concave or convex recording marks in a spiral track wherein a reflective film is formed on the recording marks. First sub information is recorded and superimposed on the main information by shifting/deforming the recording marks or altering a pattern of the recording marks. Second sub information is recorded and superimposed on the main information by changing a reflectivity of the reflective film. The first and second sub information are recorded in an area from which the first and second sub information are to be read simultaneously. The second sub information is recorded in a manner to be associated with the first sub information. The first and second sub information are associated with each other and are recorded in the same area.

19 Claims, 22 Drawing Sheets

U.S. PATENT DOCUMENTS

| | | | |
|---|---|---|---|
| 7,136,335 B2* | 11/2006 | Yumiba et al. | 369/47.28 |
| 7,196,994 B2* | 3/2007 | Yamaoka et al. | 369/53.21 |
| 7,502,307 B2* | 3/2009 | Suh et al. | 369/275.3 |
| 2003/0185128 A1 | 10/2003 | Shoji et al. | |
| 2003/0189884 A1* | 10/2003 | Yumiba et al. | 369/47.28 |
| 2003/0206511 A1 | 11/2003 | Kobayashi et al. | |
| 2004/0037200 A1 | 2/2004 | Kobayashi et al. | |
| 2004/0090887 A1 | 5/2004 | Sako et al. | |
| 2004/0196779 A1* | 10/2004 | Aratani et al. | 369/288 |
| 2004/0246846 A1* | 12/2004 | Takahashi et al. | 369/53.2 |
| 2005/0105728 A1 | 5/2005 | Yamaoka et al. | |
| 2005/0163002 A1 | 7/2005 | Kobayashi et al. | |
| 2005/0169134 A1 | 8/2005 | Kobayashi et al. | |
| 2006/0031868 A1 | 2/2006 | Yamaoka et al. | |
| 2006/0083143 A1 | 4/2006 | Kobayashi et al. | |
| 2006/0092823 A1 | 5/2006 | Kobayashi et al. | |
| 2006/0114773 A1 | 6/2006 | Kobayashi et al. | |
| 2006/0187793 A1 | 8/2006 | Fujiki | |
| 2006/0221784 A1 | 10/2006 | Kobayashi et al. | |
| 2006/0221793 A1 | 10/2006 | Kobayashi et al. | |
| 2006/0239163 A1 | 10/2006 | Kobayashi et al. | |
| 2006/0239164 A1 | 10/2006 | Kobayashi et al. | |
| 2006/0239165 A1 | 10/2006 | Kobayashi et al. | |
| 2006/0245329 A1 | 11/2006 | Kobayashi et al. | |
| 2007/0097849 A1* | 5/2007 | Sakamoto et al. | 369/288 |
| 2007/0165508 A1 | 7/2007 | Kobayashi et al. | |
| 2008/0144459 A1* | 6/2008 | Selinfreund et al. | 369/53.2 |
| 2009/0097376 A1 | 4/2009 | Yamaoka et al. | |
| 2009/0196140 A1 | 8/2009 | Yamaoka et al. | |

FOREIGN PATENT DOCUMENTS

| | | |
|---|---|---|
| JP | 11-191218 | 7/1999 |
| JP | 2000-113589 | 4/2000 |
| JP | 2000-195049 | 7/2000 |
| JP | 2000-509588 | 7/2000 |
| JP | 2000-242929 | 9/2000 |
| JP | 2001-357533 | 12/2001 |
| JP | 2002-203369 | 7/2002 |
| JP | 2003-331528 | 11/2003 |
| JP | 2005-216380 | 8/2005 |
| WO | 98/33325 | 7/1998 |
| WO | 2004/036560 | 4/2004 |
| WO | 2007/123083 | 11/2007 |
| WO | 2007/139077 | 12/2007 |

* cited by examiner

FIG. 3A

| Synchronization code | Data code | Synchronization code | Data code |
|---|---|---|---|
| SY0 | First frame | SY5 | Second frame |
| SY1 | Third frame | SY5 | Fourth frame |
| SY2 | Fifth frame | SY5 | Sixth frame |
| Sy3 | Seventh frame | SY5 | Eighth frame |
| SY4 | Ninth frame | SY5 | Tenth frame |
| SY1 | Eleventh frame | SY6 | Twelfth frame |
| SY2 | Thirteenth frame | SY6 | Fourteenth frame |
| Sy3 | Fifteenth frame | SY6 | Sixteenth frame |
| SY4 | Seventeenth frame | SY6 | Eighteenth frame |
| SY1 | Nineteenth frame | SY7 | Twentieth frame |
| SY2 | Twenty first frame | SY7 | Twenty second frame |
| Sy3 | Twenty third frame | SY7 | Twenty fourth frame |
| SY4 | Twenty fifth frame | SY7 | Twenty sixth frame |

FIG. 3B

| Synchronization code | Data code | Synchronization code | Data code |
|---|---|---|---|
| SY0 | First frame | SY5 | Second frame |
| SY1 | Third frame | SY8 | Fourth frame |
| SY2 | Fifth frame | SY5 | Sixth frame |
| Sy3 | Seventh frame | SY5 | Eighth frame |
| SY4 | Ninth frame | SY5 | Tenth frame |
| SY1 | Eleventh frame | SY6 | Twelfth frame |
| SY2 | Thirteenth frame | SY6 | Fourteenth frame |
| Sy3 | Fifteenth frame | SY8 | Sixteenth frame |
| SY4 | Seventeenth frame | SY6 | Eighteenth frame |
| SY1 | Nineteenth frame | SY8 | Twentieth frame |
| SY2 | Twenty first frame | SY7 | Twenty second frame |
| Sy3 | Twenty third frame | SY7 | Twenty fourth frame |
| SY4 | Twenty fifth frame | SY7 | Twenty sixth frame |

OPTICAL DISC, PLAYBACK APPARATUS FOR OPTICAL DISC, AND APPARATUS AND METHOD FOR MANUFACTURING OPTICAL DISC

TECHNICAL FIELD

The present invention relates to an optical disc, a playback apparatus for an optical disc, and an apparatus and a method for manufacturing an optical disc, and in particular, to a copyright protection technique for an optical disc.

BACKGROUND ART

Optical discs, which can store high-definition digital content and distribute such digital content at low cost, are used widely. For example, a Blu-ray disc (BD) has a capacity of 25 GB per layer. This means that a dual layer BD can store high-definition video with the digital broadcasting quality of up to about 4.5 hours. Such BDs have recently been used to distribute high-definition video. When compared with the DVD, a single BD can store content of up to ten DVDs. When compared with the CD, a single BD can store content of up to as many as 75 CDs. The content of a single BD can therefore be much more valuable than the content of a CD or a DVD. Thus, the sound distribution of content in the market using optical discs would be disabled by unauthorized copies of content stored in a BD or by pirated discs manufactured and shipped in the market by illegal manufacturers. As optical discs have higher capacity, expectations for copyright protection techniques for such discs become increasingly higher.

After the emergence of DVDs, the copyright protection techniques for optical discs have mainly used encryption of content. Content is encrypted before being recorded onto an optical disc to prevent unauthorized copying by malicious users. However, the encryption is effective only when the encryption key is secret. Once the encryption key is leaked out, the copyright protection using the encryption would be disabled.

The encrypted content is recorded on the optical disc medium in the form of concave or convex marks. In this case, however, the content is easily copied onto a different disc by forming the recording marks on the different disc using readout signals for the content.

Instead of encrypting the content, another conventional copyright protection technique uses sub information recorded onto a disc. The sub information is recorded onto the disc in a manner that it cannot be copied using readout signals.

With one such conventional technique, for example, sub information is recorded by slightly shifting the edge positions of recording marks in a regular manner in the tangential direction (see, for example, Patent Citations 1 to 5). With this technique of shifting the edges of recording marks in the tangential direction, the sub information is recorded as jitter of readout signals. The jitter elements are eliminated from the readout signals for the content that are extracted in synchronization with clock signals. This prevents unauthorized copying of the sub information using the readout signals.

With another such conventional technique, sub information is recorded by slightly shifting recording marks in the radial direction (see, for example, Patent Citation 6). With this technique, the readout signals for the content do not contain information about the shifts of the recording marks in the radial direction. This technique also prevents unauthorized copying of the content using the readout signals.

With another such conventional technique, synchronization code areas that are inserted in fixed cycles of recording marks are replaced by predetermined patterns (see, for example, Patent Citation 7). With this technique, the readout signals for the content do not contain the synchronization code signals. This technique also prevents unauthorized copying of the content using the readout signals.

With the above conventional techniques, the sub information is recorded by shifting the recording marks in the tangential or radial direction, or by altering the synchronization codes, which are not the information representing the content. When the sub information is recorded with any of these techniques, the readout signals for the content do not contain the sub information. These techniques therefore prevent unauthorized copying of the sub information. For discs manufactured by duplicating a master, such as ROM discs, the sub information, which is recorded by shifting the recording marks or altering the pattern of the recording marks, needs to be recorded onto the master. In this case, the sub information is unique to the master.

With another conventional technique, an optical disc substrate is first formed by duplicating a master, a reflective film is then formed on the optical disc substrate by vapor deposition and then a protective layer is formed on the reflective film to complete the disc, and then the sub information is recorded onto the completed disc by illuminating the disc at positions at predetermined distances from the edges of the recording marks with laser light to locally change the reflectivity of the information recording surface (see, for example, Patent Citation 8). When the sub information is recorded onto the disc with this technique of changing the reflectivity of the recording surface, the readout signals for the content do not contain the sub information. As a result, this technique prevents unauthorized copying of the content using the readout signals. With this conventional technique, the sub information is recorded onto the disc after the disc is completed. In this case, unlike the previously mentioned technique, the sub information is not recorded onto the master. The sub information can thus be unique to each disc.

Patent Citation 1: Japanese Unexamined Patent Publication No. H11-126426
Patent Citation 2: Japanese Unexamined Patent Publication No. 2001-357533
Patent Citation 3: Japanese Unexamined Patent Publication No. 2002-203369
Patent Citation 4: International Publication No. 2004 or 036560
Patent Citation 5: Japanese Unexamined Patent Publication No. 2005-216380
Patent Citation 6: Japanese Unexamined Patent Publication No. 2000-195049
Patent Citation 7: Japanese Unexamined Patent Publication No. 2000-113589
Patent Citation 8: Japanese Unexamined Patent Publication No. H11-191218

DISCLOSURE OF INVENTION

Technical Problem

The above conventional techniques eliminate unauthorized copies of discs by using sub information that is recorded by shifting the recording marks, altering the pattern of the recording marks, or changing the reflectivity of the recording marks so that the readout signals for the content will not contain the recorded sub information. When the disc is played, the disc is checked as to whether it is an unauthorized disc by determining whether the sub information has been recorded on the disc. An optical disc on which the sub information has not been recorded is determined as an unauthorized copy, and is prohibited from being played by a playback apparatus. In this manner, the copyright protection is enabled.

However, the content of an unauthorized disc may be played by an unauthorized playback apparatus that does not check whether the sub information has been recorded on the disc. The emergence of such an unauthorized playback apparatus would disable the copyright protection. While playback apparatuses for optical discs are now being manufactured all over the world, eliminating such an unauthorized playback apparatus would be almost impossible. This problem is caused by simple use of the sub information as an identifier for such an unauthorized disc.

The above conventional techniques only enable the sub information to be recorded in a manner that the readout signals for content do not contain the sub information. With the above conventional techniques, analogue signals obtained directly after the recording marks are read from the disc would inevitably involve the effects of the recorded sub information. This is unavoidable when the sub information is recorded onto the disc. The sub information is typically recorded by shifting the marks, alternating the mark patterns, or changing the reflectivity of the marks within the range of noise that can normally occur in an optical disc. The sub information recorded in this manner is difficult to find and thus difficult to copy.

However, unauthorized copying of the sub information using the analogue signals may be possible although it is difficult. The important task for the copyright protection techniques using the sub information is to increase the difficulty in performing such unauthorized copying of discs.

One simple method to increase the difficulty in performing unauthorized copying of discs is to use a plurality of different kinds of sub information. However, even when a plurality of different kinds of sub information are recorded, the malicious playback apparatus described above may simply process each single kind of sub information as an independent set of sub information to prove the authenticity of the disc. In this case, the efforts to prevent unauthorized copying of discs will be defeated by the malicious playback apparatus. To overcome this, the plurality of different kinds of sub information should be recorded in a manner that these different kinds of sub information are associated with one another. For example, the plurality of different kinds of sub information may be recorded in a particular format in which one kind of sub information is prohibited from being read when another kind of sub information cannot be read.

Another problem is that recording or reading the plurality of different kinds of sub information would increase the time taken for recording on the disc as well as the time taken for playing the disc. For the user, the main purpose of using the disc is not to read the sub information that has been recorded for copyright protection but is to use the content stored in the disc. The long time taken for recording and reading the sub information would not benefit the user. For example, Patent Citation 3 discloses a technique for recording first sub information on a disc by trimming a reflective film in the form of a barcode at an inner circumference side of the disc and recording second sub information on the disc by shifting the edges of recording marks in the tangential direction. With this technique, a sequence of pseudo random numbers is generated using an initial value taken from ID information obtained by reading the first sub information, and the second sub information is recorded after scrambled using the generated sequence of pseudo random numbers. With this technique, however, the first sub information and the second sub information are recorded in separate areas, and thus the overhead for the time taken for reading the first sub information and the second sub information is large.

Patent Citation 4 discloses a technique using device nullification information as an initial value. This technique also has the same problem as described above.

Technical Solution

To solve the above problems, a first aspect of the present invention provides an optical disc recorded with main information that is to be decrypted using sub information by arranging concave or convex recording marks on a spiral track and having a reflective film formed on the concave or convex recording marks. First sub information is recorded as being superimposed on the main information by shifting the concave or convex recording marks, deforming the concave or convex recording marks, or altering a pattern of the concave or convex recording marks. Second sub information is recorded as being superimposed on the main information by changing a reflectivity of the reflective film formed on the concave or convex recording marks. The first sub information and the second sub information are recorded in an area from which the first sub information and the second sub information are to be read simultaneously. The second sub information is recorded in a manner that the second sub information is associated with the first sub information.

The second sub information recorded in a manner that the second sub information is associated with the first sub information may be second sub information generated and recorded based on a part or all of the first sub information, or may be second sub information generated and recorded based on information identical to the information that has been used to generate the first sub information.

A second aspect of the present invention provides the optical disc of the first aspect of the present invention in which the main information is recorded as being divided in predetermined units that are arranged continuous to one another on the spiral track. The first sub information and the second sub information are recorded in synchronization with a predetermined unit of the main information. The second sub information recorded in synchronization with a first predetermined unit of the main information is associated with the first sub information recorded in synchronization with a second predetermined unit of the main information that precedes or follows the first predetermined unit of the main information in a direction of the spiral track.

The predetermined units are units for recording the main information. For example, the predetermined units may be units of ECC blocks, units of frames, or units of sectors.

A third aspect of the present invention provides the optical disc of the first aspect of the present invention in which the second sub information is information generated by data-conversion of predetermined information using the first sub information.

The predetermined information may be information set in advance, such as encryption key information and disc ID information.

A fourth aspect of the present invention provides the optical disc of the third aspect of the present invention in which the first sub information includes information indicating an initial value that is used to generate a pseudo random number sequence. The second sub information is information generated by scrambling the predetermined information using the pseudo random number sequence that is generated using the initial value.

A fifth aspect of the present invention provides the optical disc of the first aspect of the present invention in which the second sub information is recorded based on a recording position indicated by the first sub information.

A sixth aspect of the present invention provides the optical disc of the fifth aspect of the present invention in which the first sub information includes information indicating a recording start position of the second sub information. The second sub information is recorded from the recording start position indicated by the first sub information that is paired with the second sub information.

A seventh aspect of the present invention provides the optical disc of the first aspect of the present invention in which the first sub information is information generated by scrambling predetermined information using an initial value that is used to generate a predetermined pseudo random number sequence. The second sub information is information generated based on the initial value.

An eighth aspect of the present invention provides the optical disc of the first aspect of the present invention in which the first sub information is recorded as being coded to enable a reading error of the first sub information to be detected.

A ninth aspect of the present invention provides the optical disc of the first aspect of the present invention in which the first sub information includes information unique to a master for the optical disc.

A tenth aspect of the present invention provides the optical disc of the first aspect of the present invention in which the second sub information is recorded after the optical disc is molded.

An eleventh aspect of the present invention provides the optical disc of the first aspect of the present invention in which the second sub information includes information unique to the optical disc.

A twelfth aspect of the present invention provides an optical disc playback apparatus arranged to play an optical disc, the optical disk being recorded with main information that is to be decrypted using predetermined information by arranging concave or convex recording marks on a spiral track and having first sub information recorded by shifting the concave or convex recording marks, deforming the concave or convex recording marks, or altering a pattern of the concave or convex recording marks. The apparatus includes a main information reading unit, a first sub information detection unit, a second sub information reading unit, and a testing unit. The main information reading unit irradiates the concave or convex recording marks with laser light, and reads the main information based on a reflected light element corresponding to the concave or convex recording marks included in reflected light of the laser light. The first sub information detection unit detects the first sub information recorded so as to correspond to each unit of the main information that has been divided in predetermined units. The second sub information reading unit reads second sub information based on a change in a reflection intensity that differs from a reflection intensity of the reflected light element corresponding to the concave or convex recording marks included in the reflected light. The testing unit detects a correlation between the detected first sub information and the read second sub information, and outputs the predetermined information that is used to decrypt the main information based on a result of the detection.

A thirteenth aspect of the present invention provides the optical disc playback apparatus of the twelfth aspect of the present invention in which the first sub information detection unit detects the first sub information recorded for a first predetermined unit of the main information, and then the second sub information reading unit reads the second sub information based on a change in the reflection intensity corresponding to a concave or convex recording mark used to record a second predetermined unit of the main information that is continuous to and follows the first predetermined unit of the main information in a direction of the spiral track. The testing unit detects a correlation between the detected first sub information and the read second sub information.

A fourteenth aspect of the present invention provides the optical disc playback apparatus of the twelfth aspect of the present invention in which the testing unit detects the correlation by calculating a correlation between a pseudo random number sequence generated using an initial value indicated by the first sub information and the change in the reflection intensity.

A fifteenth aspect of the present invention provides the optical disc playback apparatus of the twelfth aspect of the present invention in which the second sub information reading unit reads the second sub information based on a recording position of the second sub information that is indicated by the first sub information.

A sixteenth aspect of the present invention provides the optical disc playback apparatus of the twelfth aspect of the present invention in which the first sub information detection unit detects the first sub information simultaneously with the second sub information reading unit reading the second sub information when the first sub information and the second sub information are recorded for a first predetermined unit of the main information. The testing unit detects the correlation between the first sub information recorded for the first predetermined unit of the main information and other second sub information recorded for a second predetermined unit of the main information that is continuous to and follows the first predetermined unit of the main information in a direction of the spiral track.

A seventeenth aspect of the present invention provides the optical disc playback apparatus of the twelfth aspect of the present invention in which the first sub information is recorded as being coded to enable a reading error of the first sub information to be detected. The apparatus further includes a first sub information error detection unit. The first sub information error detection unit determines whether an error has occurred in reading the first sub information detected by the first sub information detection unit, and suspends an operation for detecting the correlation performed by the testing unit when determining that an error has occurred.

An eighteenth aspect of the present invention provides an optical disc playback apparatus arranged to play an optical disc, the optical disc being recorded with main information that is to be decrypted using predetermined information by arranging concave or convex recording marks on a spiral track and having first sub information recorded by shifting the concave or convex recording marks, deforming the concave or convex recording marks, or altering a pattern of the concave or convex recording marks. The apparatus includes a main information reading unit, a second sub information reading unit, a testing unit, and a first sub information detection unit. The main information reading unit irradiates the concave or convex recording marks with laser light, and reads the main information based on a reflected light element corresponding to the concave or convex recording marks included in reflected light of the laser light. The second sub information reading unit reads second sub information based on a change in a reflection intensity that differs from a reflection intensity of the reflected light element corresponding to the concave or convex recording marks included in the reflected light. The testing unit detects information associated with the first sub information from the second sub information. The first sub information detection unit reads the first sub information, detects a correlation between the read first sub information and the information associated with the first sub information, and outputs the predetermined information that is used to decrypt the main information based on a result of the detection.

A nineteenth aspect of the present invention provides the optical disc playback apparatus of the eighteenth aspect of the present invention in which the second sub information reading unit reads the second sub information recorded for a first predetermined unit of the main information, and then the first sub information detection unit reads the first sub information recorded for a second predetermined unit of the main information that is continuous to and follows the first predetermined unit of the main information in a direction of the spiral track.

A twentieth aspect of the present invention provides the optical disc playback apparatus of the eighteenth aspect of the present invention in which the first sub information detection unit detects the first sub information simultaneously with the second sub information reading unit reading the second sub information when the first sub information and the second sub information are recorded for a first predetermined unit of the main information. The testing unit detects the information associated with other first sub information recorded for a second predetermined unit of the main information that is continuous to and follows the first predetermined unit of the main information in a direction of the spiral track, from the second sub information recorded for the first predetermined unit of the main information.

A twenty first aspect of the present invention provides an optical disc manufacturing apparatus arranged to record second sub information onto an optical disc, the optical disc being recorded with main information that is to be decrypted using predetermined information by arranging concave or convex recording marks on a spiral track and having first sub information. The apparatus includes a first sub information detection unit and a second sub information recording unit. The first sub information detection unit detects the first sub information by detecting a shift of the concave or convex recording marks, a deformation of the concave or convex recording marks, or an alteration of a pattern of the concave or convex recording marks for each unit of the main information that has been recorded as being divided in predetermined units. The second sub information recording unit records the second sub information by controlling an intensity of laser light with which a reflective film formed on the concave or convex recording marks of the optical disc is irradiated in accordance with a control signal generated in association with the predetermined information and the detected first sub information.

The control signal generated in association with the first sub information may be a control signal generated based on a part or all of the first sub information, or may be a control signal generated based on information identical to the information that has been used to generate the first sub information.

A twenty second aspect of the present invention provides the optical disc manufacturing apparatus of the twenty first aspect of the present invention in which the first sub information detection unit detects the first sub information recorded for a first predetermined unit of the main information, and then the second sub information recording unit records the second sub information for a second predetermined unit of the main information that is continuous to and follows the first predetermined unit of the main information in a direction of the spiral track in accordance with the control signal generated in association with the detected first sub information.

A twenty third aspect of the present invention provides the optical disc manufacturing apparatus of the twenty first aspect of the present invention in which the control signal is a signal generated by scrambling the predetermined information using a pseudo random number sequence generated using the first sub information as an initial value.

A twenty fourth aspect of the present invention provides the optical disc manufacturing apparatus of the twenty first aspect of the present invention in which the control signal is a signal used to record the second sub information at a recording position indicated by the first sub information.

A twenty fifth aspect of the present invention provides the optical disc manufacturing apparatus of the twenty first aspect of the present invention in which the first sub information detection unit detects the first sub information recorded for a first predetermined unit of the main information simultaneously with the second sub information recording unit recording the second sub information for the first predetermined unit of the main information. The first sub information recorded for the first predetermined unit of the main information is used to record other second sub information for a second predetermined unit of the main information that is continuous to and follows the first predetermined unit of the main information in a direction of the spiral track.

A twenty sixth aspect of the present invention provides an optical disc manufacturing apparatus arranged of record second sub information onto an optical disc, the optical disk being recorded with main information that is to be decrypted using predetermined information by arranging concave or convex recording marks on a spiral track and having first sub information recorded based on the predetermined information. The apparatus includes a second sub information recording unit. The second sub information recording unit records the second sub information by controlling an intensity of laser light with which a reflective film formed on the concave or convex recording marks of the optical disc is irradiated in accordance with a control signal generated based on information on which the first sub information is also based.

A twenty seventh aspect of the present invention provides an optical disc manufacturing method of recording second sub information onto an optical disc, the optical disc being recorded with main information that is to be decrypted using predetermined information by arranging concave or convex recording marks on a spiral track and having first sub information. The method includes a second sub information recording process. In the second sub information recording process, the second sub information is recorded by controlling an intensity of laser light with which a reflective film formed on the concave or convex recording marks of the optical disc is irradiated in accordance with a control signal generated in association with the predetermined information and the first sub information.

A twenty eighth aspect of the present invention provides the optical disc manufacturing method of the twenty seventh aspect of the present invention further including a first sub information detection process. In the first sub information detection process, the first sub information is detected by detecting a shift of the concave or convex recording marks, a deformation of the concave or convex recording marks, or an alteration of a pattern of the concave or convex recording marks for a predetermined unit of the main information that has been recorded as being divided in predetermined units. In the second sub information recording process, the second sub information is recorded in accordance with the control signal generated in association with the detected first sub information.

A twenty ninth aspect of the present invention provides the optical disc manufacturing method of the twenty seventh aspect of the present invention in which the first sub information and the second sub information are recorded in synchronization with a predetermined unit of the main information. The second sub information recorded in synchronization with a first predetermined unit of the main information is associated with the first sub information recorded in synchronization with a second predetermined unit of the main information that precedes or follows the first predetermined unit of the main information in a direction of the spiral track.

Advantageous Effects

The optical disc, the optical disc manufacturing apparatus, the optical disc playback apparatus, and the optical disc manufacturing method of the present invention improve resistance to unauthorized copying of content stored in an optical disc by recording a plurality of sets of sub information on the optical disc, and also reduce the overhead for reading the sub information by recording the plurality of sets of sub information into the same area from which the plurality of sets of sub information can be read simultaneously. Also, the optical disc, the optical disc manufacturing apparatus, the optical disc playback apparatus, and the optical disc manufacturing method of the present invention eliminate unauthorized playback apparatuses that would bypass readout of the sub information by recording the plurality of sets of sub information in a manner that the plurality of sets of sub information are associated with one another. The present invention therefore enables digital content to be distributed in a reliable manner using an optical disc.

The present invention improves the level of copyright protection for digital content stored in an optical disc by recording a plurality of sets of sub information in a manner that unauthorized copying of the sub information is difficult. The plurality of sets of sub information are recorded in a format in which one set of sub information can not be read unless another set of sub information is read. This prevents a malicious playback apparatus from bypassing readout of the sub information and using the digital content stored in the optical disc in an unauthorized manner. The present invention further enables, as the plurality of sets of sub information, first sub information to be recorded onto the optical disc as information unique to a master for the optical disc, and second sub information to be recorded onto the molded optical disc as information unique to each recording medium. In this case, in order to read the second sub information, the first sub information unique to the optical disc master needs to be read. This structure prevents unauthorized use of digital content using an unauthorized medium from which only the information unique to the recording medium can be detected.

BRIEF DESCRIPTION OF DRAWINGS

FIGS. 3A and 3B are conceptual diagrams showing the recording pattern of first sub information on the optical disc.

BEST MODE FOR CARRYING OUT THE INVENTION

1. First Embodiment

A first embodiment of the present invention will now be described with reference to the drawings.

1.1 First Embodiment Overview

Figure 1:
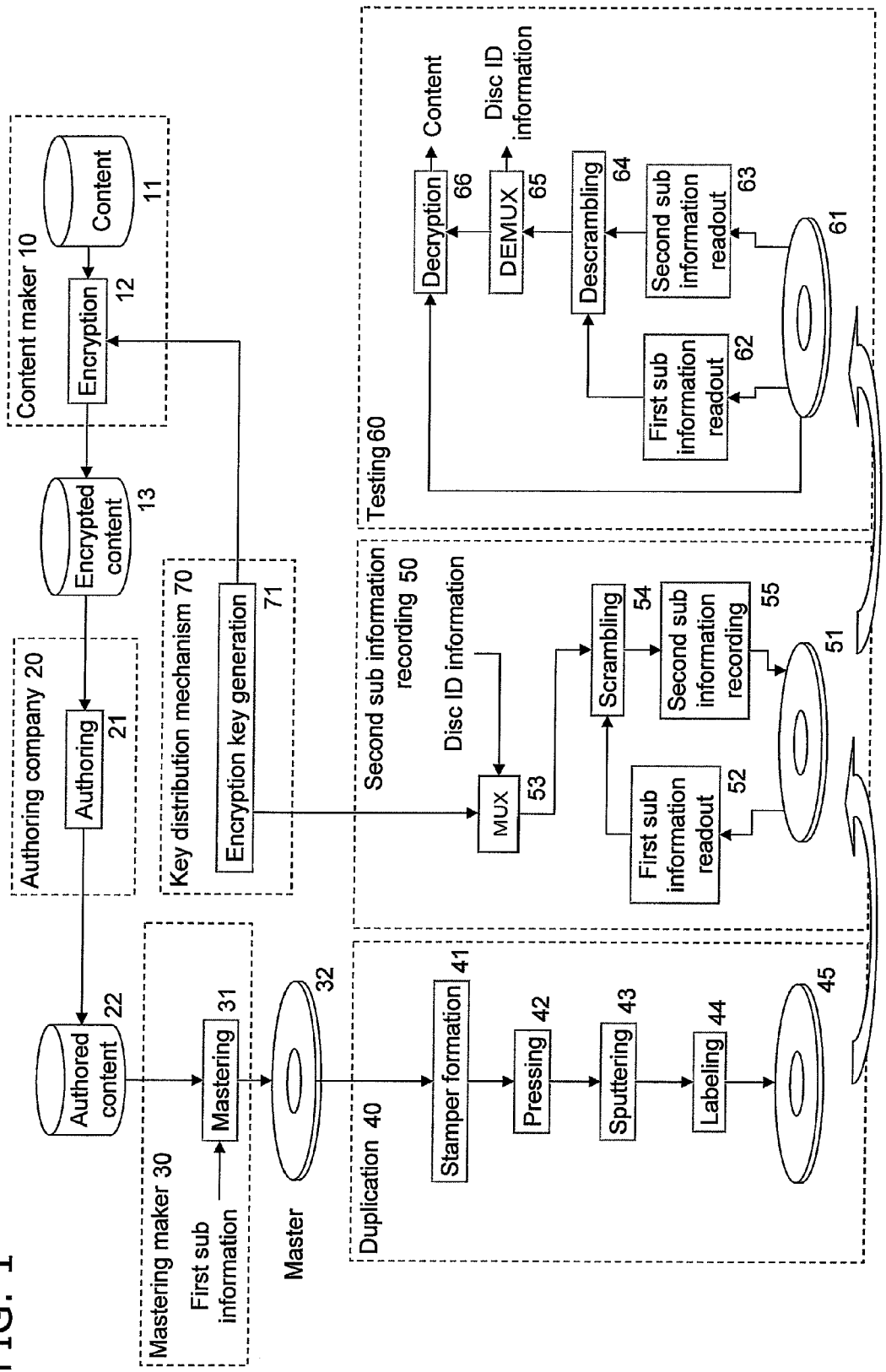
FIG. 1 is a flowchart showing processes for manufacturing an optical disc according to a first embodiment of the present invention.

FIG. 1 is a flowchart showing processes for manufacturing an optical disc. The manufacturing processes for an optical disc involve a content maker 10, an authoring company 20, a mastering maker 30, duplication 40, second sub information recording 50, testing 60, and a key distribution mechanism 70.

The content maker 10 is a maker that produces content, such as a movie company, a broadcasting company, or a game maker. The content maker 10 produces content 11, and performs encryption 12 of the content 11 using an encryption key, which has been generated through encryption key generation 71 in the key distribution mechanism 70, and generates encrypted content 13. The encrypted content 13 is then sent to the authoring company 20. For example, the encrypted content 13 may be stored into a recording medium and sent to the authoring company 20, or the encrypted content 13 may be distributed to the authoring company 20 via a network.

The authoring company 20 performs typical authoring 21. The authoring company 20 generates authored content 22 by authoring the encrypted content 13, which has been sent from the content maker 10, in accordance with the format of a recording medium for storing the encrypted content 13, and sends the generated authored content 22 to the mastering maker 30.

The mastering maker 30 is a company that performs mastering 31 based on the authored content 22 sent from the authoring company 20. In the mastering, resist is applied to a glass substrate, which is then cut by irradiating with laser light in accordance with the authored content 22. The cut glass substrate is then developed to complete a master 32 for an optical disc. The completed master 32 for an optical disc is then sent to the duplication 40. The duplication 40 is performed by, for example, a company called a duplicator, which specializes in duplication.

In the mastering 31, first sub information is recorded as being superimposed on information representing the content, or content information, by changing the recording signals for the authored content 22 based on the first sub information. In the present embodiment, the first sub information is recorded by altering the synchronization codes. When the authored content 22 is modulated in accordance with the first sub information by a formatter (not shown), the patterns of synchronization codes, which are inserted in fixed cycles, are altered in accordance with the first sub information. Through this process, the first sub information is recorded onto the optical disc master 32 together with the content information. The present embodiment describes the case in which the mastering maker 30 generates the first sub information. The first sub information may be, for example, a random number sequence that differs depending on each optical disc master.

The duplication 40 first includes stamper formation 41, in which a stamper is formed by pouring nickel or the like into the optical disc master 32, and molding the stamper using the master as a mold. Pressing 42 is subsequently performed, in which the stamper formed in the stamper formation 41 is pressed onto an optical disc substrate that is made of, for example, polycarbonate. Sputtering 43 is then performed, in which aluminum or silver is sputtered onto the optical disc substrate on which concave or convex recording marks have been formed, and then a protective layer and other necessary elements are formed on the substrate. Labeling 44 is then performed, in which a label or the like is printed on the surface of the disc that is opposite to its information reading surface. This completes an optical disc 45. The completed optical disc 45 is then sent to the second sub information recording 50.

The second sub information recording 50 first includes first sub information readout 52, in which the first sub information is read from the optical disc 45, which has been completed through the duplication 40. In the present embodiment, the first sub information is read by detecting the altered synchronization codes that are inserted in fixed cycles of the recording marks on the disc.

In the second sub information recording 50, a content encryption key, which is generated by the key distribution mechanism 70, is obtained. In the second sub information recording 50, the obtained encryption key is then input into a multiplexer (MUX) 53, in which the encryption key information is concatenated with disc ID information that is uniquely set for each optical disc. In the present embodiment, 256-bit information is generated by simply concatenating the encrypted key information (128 bits) and the disc identification information (128 bits). The encryption key information and the disc ID information may be concatenated with by any method that enables the encryption key and the disc ID information to be separated later. The resulting 256-bit information (hereafter referred to as the "scrambling-target information") is then output to scrambling 54.

In the scrambling 54, the scrambling-target information, which has been generated by the MUX 53, is scrambled using the first sub information that has been read from an optical disc 51 through the first sub information readout 52. The scrambling is specifically the data conversion performed between the scrambling-target information and a pseudo random number sequence that has been generated using the first sub information as an initial value.

The scrambled information generated through the scrambling 54 is then recorded onto the optical disc 51 as the second sub information. In the present embodiment, the second sub information is recorded using marks that change reflectivity (hereafter referred to as "reflectivity-changing marks"), which are formed by irradiating the optical disc 51 with laser light and changing the reflectivity of the reflection film. The disc 51 on which the second sub information has been recorded is then sent to the testing 60.

The scrambled information generated through the scrambling 54, which is recorded as the second sub information, may be coded using error correction codes. Such error correction coding will drastically improve the reliability of the read second sub information, although the number of redundant bits will increase.

In the testing 60, signals are read for testing from an optical disc 61 on which the second sub information has been recorded through the second sub information recording 50. The testing 60 first includes first sub information readout 62, in which the first sub information is read from the optical disc by detecting the altered synchronization codes in the same manner as in the second sub information recording 50. While the first sub information is being read, second sub information readout 63 is performed, in which the second sub information is read from the optical disc by detecting the locally changed reflectivity of the recording marks of the optical disc. Descrambling 64, which is reverse to the scrambling 54 in the second sub information recording 50, is then performed using the read first sub information and the read second sub information to extract a signal representing the scrambling-target information (hereafter referred to as a "scrambling-target information signal"). The disc ID information and the encryption key are then separated from the extracted scrambling-target information signal by a demultiplexer (DEMUX) 65. Decryption 66 is then performed, in which the content stored in the optical disc 61 is decrypted using the encryption key, and the decrypted content is finally read.

The testing of the disc is completed when the readout of the first sub information, the readout of the second sub information, the descrambling of the second sub information performed using the first sub information, and the decryption of the content are all completed successfully. The disc that has passed the testing is packaged and is then shipped. When any of the readout of the first sub information, the readout of the second sub information, the descrambling of the second sub information performed using the first sub information, and the decryption of the content is unsuccessful, the disc is discarded as a defective disc. An error in reading the second sub information may be detected when the second sub information has been coded using error correction codes. In that case, the disc may be discarded as a defective disc even when the error is correctable.

The optical disc of the present embodiment is manufactured through the processes described above.

The recording and readout of the first sub information and the second sub information in the present embodiment will now be described in detail with reference to the drawings.

1.2 Optical Disc

Figure 2:
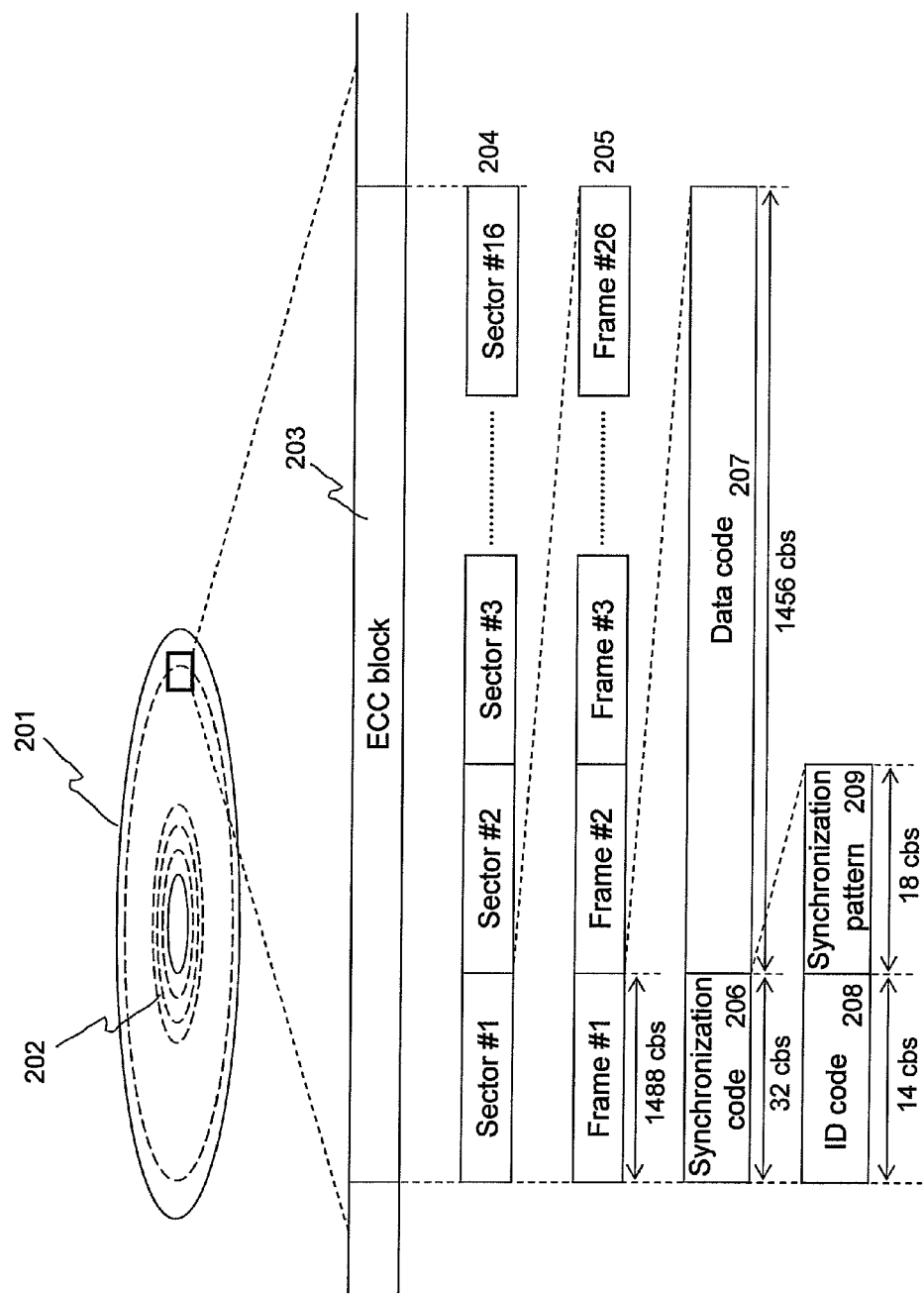
FIG. 2 is a conceptual diagram showing the structure of the optical disc according to the first embodiment.

FIG. 2 is a conceptual diagram showing the structure of a typical optical disc. In this example, the optical disc is assumed to be a DVD.

On an optical disc 201, a sequence of recording marks is recorded in the circumferential direction. Information representing the content, or content information, is recorded using this sequence of recording marks. The sequence of recording marks is formed in a spiral, which is called a track 202.

As the information recorded using the recording marks, information coded using error correction codes is recorded in units of ECC blocks 203, which are arranged continuous to one another on the track. Each ECC block 203 contains a fixed unit of content information (32 KB for a DVD).

Each ECC block consists of sectors 204 each having address information. For a DVD, each ECC block consists of 16 sectors.

Each sector 204 consists of frames having synchronization codes that are inserted in fixed cycles of frames. Each sector consists of 26 frames.

For a DVD, each frame has a length of 1488 channel bits, in which the first 32 channel bits form a synchronization code 206, and the remaining 1456 channel bits form a data code 207.

The synchronization code consists of an ID code 208 having 14 channel bits and a synchronization pattern 209 having 18 channel bits. The ID codes 208 can be used to decode frame addresses within the sector 204. Using the ID codes of at least two continuous frames, the frame addresses within the sector can be obtained. The synchronization pattern 209 is common to all synchronization codes. The data code area does not contain the synchronization pattern 209. Thus, the beginning of each frame can be determined by detecting the synchronization pattern. The synchronization pattern used for a DVD is the pattern 14T4T. The data code area does not contain 14T marks or spaces that form this pattern.

In the present embodiment, the structure of the optical disc, which is assumed to be a DVD, will be described using the DVD format described above.

FIGS. 3A and 3B show the sector structure of a DVD.

FIG. 3A shows a typical sector structure of a DVD.

The sector consists of the first to the twenty sixth frames, or 26 frames in total. Each frame consists of a synchronization code having 32 channel bits and a data code having 1456 channel bits. The synchronization codes are given reference numerals SY0 to SY7, each of which indicates a synchronization code pattern that can be identified by an ID code included in the corresponding synchronization code. The DVD has eight synchronization code patterns SY0 to SY7.

The synchronization code patterns can be used to decode frame addresses within the sector. For example, a frame having the synchronization code SY0 is the first frame positioned at the beginning of the sector. A frame having the synchronization code SY5 can be determined as follows. When preceded by a frame having the synchronization code SY0, the frame having the synchronization code SY5 is determined to be the second frame of the sector. When preceded by a frame having the synchronization code SY1, the frame having the synchronization code SY5 is determined to be the fourth frame of the sector. In this manner, the address of each frame, except the first frame at the beginning of the sector, is extracted by detecting the synchronization code patterns of at least two continuous frames.

1.2.1 First Sub Information

FIG. 3B shows the sector structure of the optical disc on which the first sub information has been recorded.

In the present embodiment, the sub information is recorded using either altered or unaltered synchronization codes in the fourth, eighth, twelfth, sixteenth, twentieth, and twenty fourth frames. The altered synchronization code indicates that the bit value of 1 is recorded as the first sub information, whereas the unaltered synchronization code indicates that the bit value of 0 is recorded as the sub information. Among the fourth, eighth, twelfth, sixteenth, twentieth, and twenty fourth frames, in this example, the synchronization codes of the fourth, sixteenth, and twentieth frames have been altered from the normal patterns SY5, SY6, and SY7 to the abnormal pattern SY8. Each altered code is extracted as the bit value of 1, whereas each unaltered code is extracted as the bit value of 0. The resulting 6-bit information will be 100110, which is read as the first sub information.

In this manner, first sub information having 6 bits can be recorded into a single sector in the present example. This means that first sub information having 6*16 bits, or 96 bits in total, can be recorded in each ECC block.

As described above, the sub information is recorded using either altered or unaltered ID codes of the synchronization codes that are inserted in units of frames. In the present embodiment, the synchronization codes of the fourth, eighth, twelfth, sixteenth, twentieth, and twenty fourth frames can be altered. Even when the synchronization codes of all these frames have been altered, the synchronization codes of the three frames preceding each of these frames will remain unaltered. Thus, when the synchronization codes of the fourth, eighth, twelfth, sixteenth, twentieth, and twenty fourth frames have been altered to disable their frame addresses to be determined in a normal manner, these frame addresses can be easily complemented based on the continuity of the three frames preceding each of the altered frames.

A typical playback apparatus has the complementing function for possible failures to detect synchronization codes due to the disc quality. Thus, readout of the content information will not be disturbed by the first sub information recorded on the disc. Also, the synchronization pattern part which defines a synchronization code will remain unaltered. In this case, a synchronization code can be detected even when the synchronization code has been altered. Thus, the operation for reading the content will not be disturbed by such altered synchronization codes.

Figure 4:
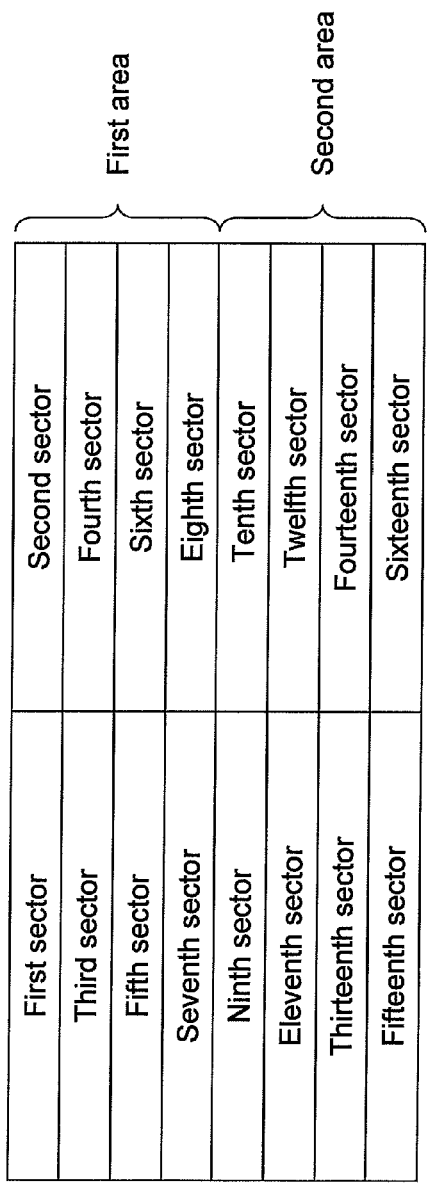
FIG. 4 is a conceptual diagram showing the sector structure of the optical disc.

FIG. 4 is a conceptual diagram showing the structure of an ECC block included in the optical disc according to the present embodiment in which the first sub information has been recorded. As described above, the ECC block consists of 16 sectors each having a sector address. As described with reference to FIGS. 3A and 3B, first sub information having 6 bits is recorded into each sector by altering the synchronization codes. In the present embodiment, the first to eighth sectors are assumed to form a first area, whereas the ninth to sixteenth sectors are assumed to form a second area. The 48-bit information of first sub information is recorded into the first area consisting of the eight sectors. The other 48-bit information of first sub information is recorded into the second area consisting of the eight sectors. In the present embodiment, the first sub information recorded into the first area indicates an initial value (hereafter referred to as a "scrambling initial value") of a pseudo random number sequence that is used to record the second sub information, whereas the first sub information recorded in the second area indicates a start position from which the second sub information is to be recorded or a recording start position of the second sub information.

Figure 5:
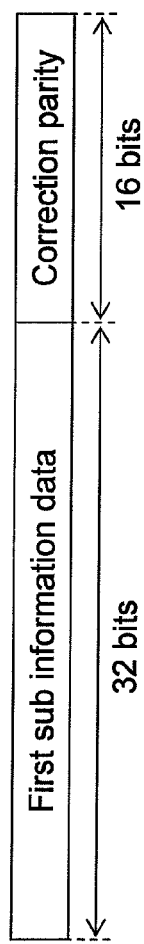
FIG. 5 shows the structure of the first sub information recorded on the optical disc.

FIG. 5 shows the format of the first sub information recorded in each of the first and second areas shown in FIG. 4.

The 48-bit first sub information, which has been recorded in each of the first and second areas, is coded using error correction codes. The 48-bit first sub information consists of 32-bit data representing the first sub information and the 16-bit correction parity. Reed-Solomon codes are used as the error correction codes. The first sub information recorded in the first area consists of 32-bit information indicating the scrambling initial value, which is used to scramble the second sub information, and its 16-bit correction parity. The first sub information recorded in the second area consists of 32-bit information indicating the recording start position of the second sub information and its 16-bit correction parity.

The first sub information is coded using error correction codes, and thus includes the 16-bit parity. Even when a single bit of the first sub information is read erroneously, the erroneously read bit can be corrected to enable the first sub information to be extracted in a correct manner. In the present embodiment, the first sub information is coded using the 16-bit Reed-Solomon codes. This enables the first sub information to be corrected in 1-byte units. Such error correction of the first sub information increases the possibility of the first sub information being read in a stable manner even when the accuracy of the read first sub information may be degraded by flaws, finger marks, or dirt on the disc. When the information contains errors that cannot be corrected, the state in which the information contains uncorrectable errors will be detected.

1.2.2 Second Sub Information

Figure 6:
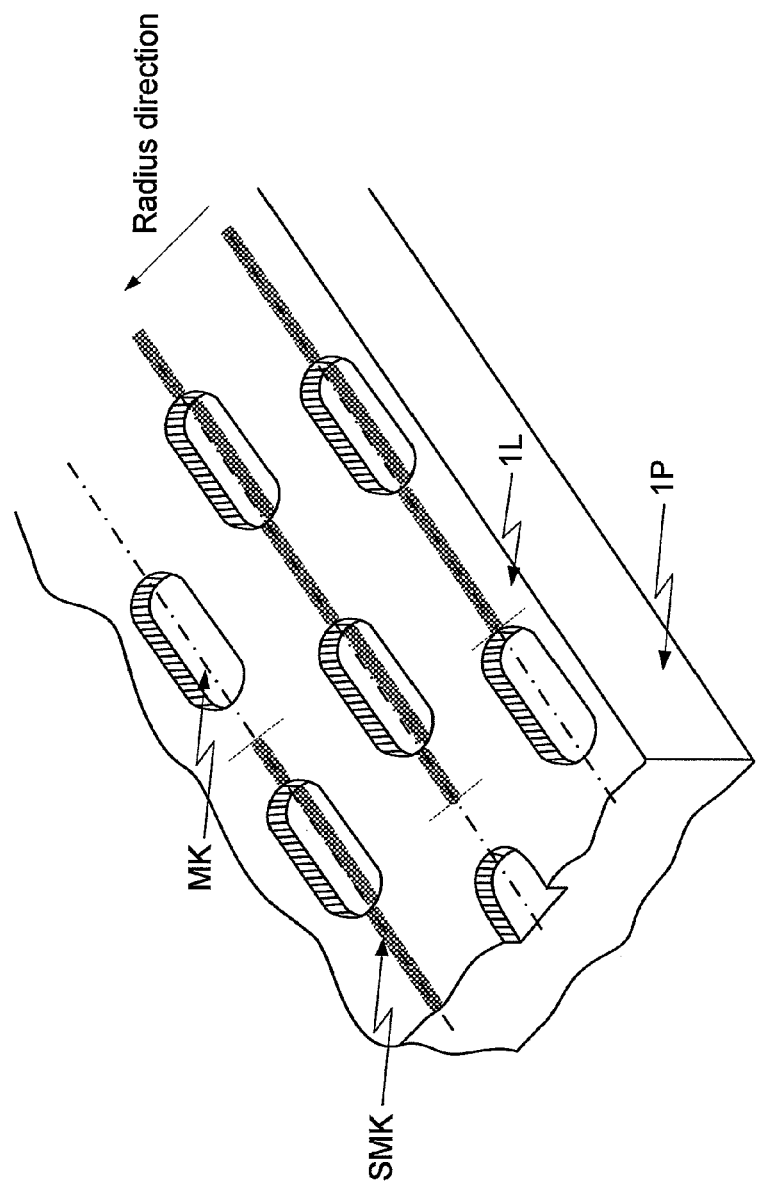
FIG. 6 shows the surface details of the optical disc.

FIG. 6 is a conceptual diagram showing a method for recording the second sub information according to the present embodiment.

Main information including the content information is recorded before the second sub information according to the present embodiment is recorded. The main information is transferred onto an optical disc substrate 1P, which is made, for example, of polycarbonate resin, in the form of concave or convex recording marks MK, which are stamped using a stamper that has been formed using the optical disc master. After the main information is transferred onto the substrate using the stamper, a reflective film 1L, which is made, for example, of aluminum or silver, is formed on the concave or convex recording marks MK. The depth of each concave is set to about λ or 4, where λ is the wavelength of laser light that is used to read the main information. Although FIG. 6 shows the recording marks as concave marks, the recording marks may be convex marks. When the recording marks are convex marks, the height of each convex mark may also be set to about λ or 4. When the reflective film 1L is irradiated with laser light having controlled focus, the phase of reflected light of the laser light irradiating the concave or convex recording marks and the phase of reflected light of the laser light reaching mirror plane portions other than the concave or convex recording marks will differ from each other by 180 degrees (will be inverted). The concave or convex recording marks are irradiated with laser light having a laser spot larger than the width of the marks. In this case, the reflected light from the concave or convex recording marks and the reflected light from the mirror plane portions, which have the inverted phases, will cancel out to lower the reflected light intensity. The mirror plane portions will ideally have the largest reflected light intensity. This enables the recording marks to be read based on the intensity of the reflected light. To read the main information, the recording marks will be read as binary digital signals.

The second sub information according to the present embodiment is recorded by further irradiating the aluminum or silver reflective film 1L with laser light and lowering the reflection precision of the reflective film 1L. The aluminum or silver reflective film deteriorates when the film is irradiated with laser light. The reflective film deteriorates as, for example, the reflective film melts when heated through the laser light irradiation. In the present embodiment, the concave or convex recording marks are first stamped onto the optical disc substrate 1P and then the reflective film is deposited on the concave or convex recording marks, and then a protective layer and other necessary elements are formed to cover the concave or convex recording marks. This completes the disc. On the completed optical disc, the second sub information is recorded by further irradiating with laser light a track formed by the concave or convex recording marks MK extending in the circumferential direction. Through the laser light irradiation, the second sub information is recorded as marks having lower reflectivity of the reflective film, which are referred to as reflectivity changing marks SMK. To read the second sub information, the lowered reflectivity of the reflective film will be detected through integration.

1.2.3 Recording First Sub Information and Second Sub Information.

Figure 7:
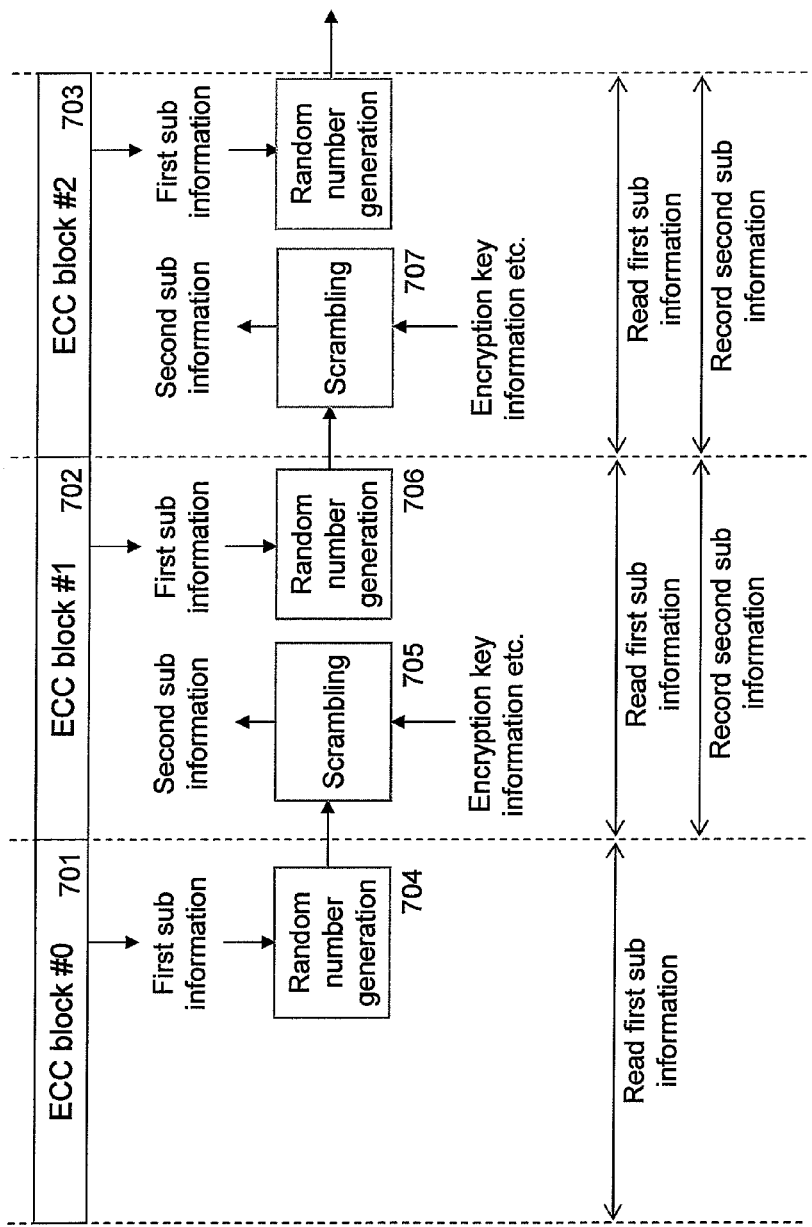
FIG. 7 is a flowchart showing a method for recording second sub information on the optical disc.

FIG. 7 is a conceptual diagram showing a method for recording the first sub information and the second sub information onto the optical disc according to the present embodiment. In this example as well, the optical disc of the present embodiment is assumed to be a DVD-ROM.

As the recording format of a DVD-ROM is described with reference to FIG. 2, information is recorded onto the DVD-ROM in units of ECC blocks, each of which consists of 16 sectors each having a sector address and each including 26 frames into which synchronization codes are inserted in fixed cycles. The ECC blocks have been coded using error correction codes, and are arranged continuous to one another on the track in the circumferential direction of the optical disc. In the present embodiment, ECC blocks #0 (701), #1 (702), and #2 (703) are arranged sequentially in the circumferential direction of the optical disc.

On the optical disc according to the present embodiment, the first sub information has been recorded by altering the ID codes of the synchronization codes of the frames during manufacture of the optical disc master. As described with reference to FIG. 4, in the present embodiment, the 32-bit information indicating the scrambling initial value of the second sub information, together with the 16-bit error correction parity using the Reed-Solomon codes, has been recorded in the first eight sectors, the first to eighth sectors, of each ECC block. Also, the 32-bit information indicating the recording start position of the second sub information, together with the 16-bit error correction parity using the Reed-Solomon codes, has been recorded in the subsequent eight sectors, the ninth to sixteenth sectors, of each ECC block.

With the method for recording the first sub information and the second sub information onto the optical disc according to the present embodiment, an optical disc manufacturing apparatus (described later) first reads the ECC block #0 of the optical disc. Then, the optical disc manufacturing apparatus obtains, as the first sub information, the scrambling initial value of the second sub information and the recording start position of the second sub information. While reading the first sub information from the ECC block #0 (701), the apparatus can also read the main information including the content information.

When the ECC block #0 (701) is read completely, the ECC block #1 (702), which is continuous to the ECC block #0 (701) in the track direction, is processed next. At the beginning position of the ECC block #1 (702), the scrambling initial value of the second sub information that has been read as the first sub information from the ECC block #0 (701) is set to be used by a random number generator (704). Subsequently, the ECC block #1 (702) is read until the current reading position reaches the recording start position of the second sub information that has been read as the first sub information from the ECC block #0 (701). When the current reading position reaches the recording start position, the encryption key information (scrambling-target information) etc. are scrambled (705) using a random number sequence generated by the random number generator (704) to record the second sub information into the ECC block #1 (702). The scrambling initial value and the recording start position of the second sub information that have been recorded in the ECC block #0 as the first sub information are used as the scrambling initial value and the recording start position of the second sub information that are to be recorded into the next ECC block, namely the ECC block #1 (702).

In the ECC block #1 (702), the first sub information that has been recorded in the ECC block #1 (702) is read while the second sub information is being recorded into the ECC block #1 (702). The first sub information that has been recorded in the ECC block #1 (702) indicates the scrambling initial value and the recording start position of the second sub information that is to be recorded into the ECC block #2 (703), which is continuous to the ECC block #1 (702). The first sub information has been recorded in the ECC block #1 (702) by altering the ID codes of the synchronization codes that are inserted in units of frames of the ECC block #1 (702) as shown in FIG. 3A.

When the first sub information is read completely from the ECC block #1 (702) and the second sub information is recorded completely into the ECC block #1 (702), the ECC block #2 (703), which is continuous to the ECC block #1 (702) in the track direction, is processed next. At the beginning position of the ECC block #2 (703), the scrambling initial value of the second sub information that has been read as the first sub information from the ECC block #1 (702) is set to be used by a random number generator (706). Subsequently, the ECC block #2 (703) is read until the current reading position reaches the recording start position of the second sub information that has been read as the first sub information from the ECC block #1 (702). When the current reading position reaches the recording start position, the encryption key information (scrambling-target information) etc. are scrambled (707) using a random number sequence generated by the random number generator (706) to record the second sub information into the ECC block #2 (703). The scrambling initial value and the recording start position of the second sub information that have been recorded in the ECC block #1 as the first sub information are used as the scrambling initial value and the recording start position of the second sub information that are to be recorded into the next ECC block, namely the ECC block #2 (703).

In the ECC block #2 (703), the first sub information that has been recorded in the ECC block #2 (703) is read while the second sub information is being recorded into the ECC block #2 (703). The first sub information that has been recorded in the ECC block #2 (703) indicates the scrambling initial value and the recording start position of the second sub information that is to be recorded into an ECC block (not shown) that is continuous to the ECC block #2 (703). The first sub information has been recorded in the ECC block #2 (703) by altering the ID codes of the synchronization codes that are inserted in units of frames of the ECC block #2 (703) as shown in FIG. 3A.

As described above, the optical disc has ECC blocks, which function as the units for recording information, and the first sub information has been recorded onto the optical disc in units of ECC blocks by altering the ID codes of the synchronization codes included in the frames. The first sub information indicates the scrambling initial value and the recording start position of the second sub information, which are used to record the second sub information into the next ECC block continuous to the currently processed ECC block in the track direction. In each ECC block, the first sub information is read simultaneously as when the second sub information is recorded using the first sub information that has been read in an ECC block immediately preceding the currently processed ECC block in the track direction. The second sub information is recorded using signals that have been scrambled based on the random number sequence initialized using the scrambling initial value, which has been read as the first sub information from the immediately preceding ECC block. More specifically, the second sub information is recorded by locally lowering the reflectivity of the reflective film of the optical disc through irradiation of laser light having a changed intensity in accordance with the scrambled signals. More specifically, the irradiation of laser light having an intensity that would lower the reflectivity of the reflective film is started at the recording start position of the second sub information that has been read as the first sub information from the immediately preceding ECC block. As a result, the second sub information is recorded using the reflectivity changing marks that are formed on the reflective film.

In the present embodiment, the recording start position of the second sub information, which is recorded as the first sub information, is specifically a sector address at which the recording of the second sub information is to be started in an ECC block immediately following the ECC block from which the first sub information is read. The recording start position of the second sub information can therefore be changed in units of ECC blocks. This prevents a malicious third party from analyzing the second sub information in an unauthorized manner.

Although the present embodiment describes the case in which the recording start position of the second sub information, which is recorded as the first sub information, is specifically the sector address at which the recording of the second sub information is to be started in an ECC block immediately following the ECC block from which the first sub information is read, the present invention should not be limited to this structure. The recording start position of the second sub information may be a position deviating in channel bits from the beginning position of the ECC block from which the recording is to be started or a position of a frame from which the recording of the second sub information is to be started.

When the recording of the second sub information is started at the same recording start position in all ECC blocks, unauthorized analysis of the second sub information may be performed more easily. To prevent this, the present embodiment is designed to include any means for changing the recording start position of the second sub information in units of ECC blocks, which is included in the scope of the present invention.

In the present embodiment, both the first sub information and the second sub information are recorded in synchronization with the units of ECC blocks, or sectors or frames. This enables the first sub information and the second sub information to be read simultaneously with the main information, without requiring to use synchronization codes unique to the first sub information and the second sub information. The first sub information and the second sub information are recorded with different methods. More specifically, the first sub information is recorded by altering the synchronization codes of the frames, whereas the second sub information is recorded by changing the reflectivity of the reflective film through laser light irradiation and forming the reflectivity changing marks. This enables the first sub information to be read and the second sub information to be recorded simultaneously. As a result, although the two different sets of information, namely the first sub information and the second sub information, are recorded on the optical disc, the readout of the first sub information and the recording of the second sub information can be performed simultaneously without reducing the main information area of the optical disc and without unnecessarily increasing the time taken for recording the information.

To create a copy of this optical disc, both the altered synchronization codes and the changed reflectivity of the reflective film, which are not contained in the readout signals for the content, need to be copied onto another disc. Even when only the first sub information recorded on this optical disc is successfully copied onto a different disc, the disc, which fails to contain the second sub information including the encryption key information for the content, would have no value.

Even when only the second sub information recorded on the optical disc is successfully copied onto a different disc, the first sub information indicating the scrambling initial value used for reading the second sub information and the recording start position of the second sub information cannot be read from the disc. In that case, the second sub information cannot be read from the disc. As a result, the content cannot be read from the disc.

To create an unauthorized copy of the optical disc, both the first sub information and the second sub information, which have been recorded onto the optical disc with different methods, not only need to be copied into the same area but also need to be copied simultaneously. This would be almost impossible for a third party who is not notified of the methods that have been used to record the first sub information and the second sub information. This structure enables copyright protection of content stored in an optical disc to be achieved with a level higher than conventional copyright protection.

In the procedure described in the present embodiment, the first sub information is read from the immediately preceding ECC block and then the second sub information is recorded using the read first sub information. In this case, if the first sub information is read erroneously, the second sub information will be recorded erroneously. If the second sub information is recorded erroneously, the second sub information will be definitely read erroneously. To avoid this, data associating the first sub information recorded during manufacture of the master with each ECC block may be input into the apparatus for recording the second sub information. This enables the second sub information to be recorded in a more reliable manner.

Although the present embodiment describes the case in which the first sub information and the second sub information are recorded in units of ECC blocks, the present invention should not be limited to this structure. The sub information may not be associated with the synchronization codes. It is only required that the first sub information and the second sub information be recorded in synchronization with the main information. The first sub information and the second sub information may be recorded in units of clusters, such as frames, sectors, or ECC blocks, or may be recorded in a manner that a plurality of such clusters are used as a single unit for recording the information. Such modifications are within the scope of the present invention, and will have the same advantageous effects as the effects of the present embodiment.

1.2.4 Reading First Sub Information and Second Sub Information

Figure 8:
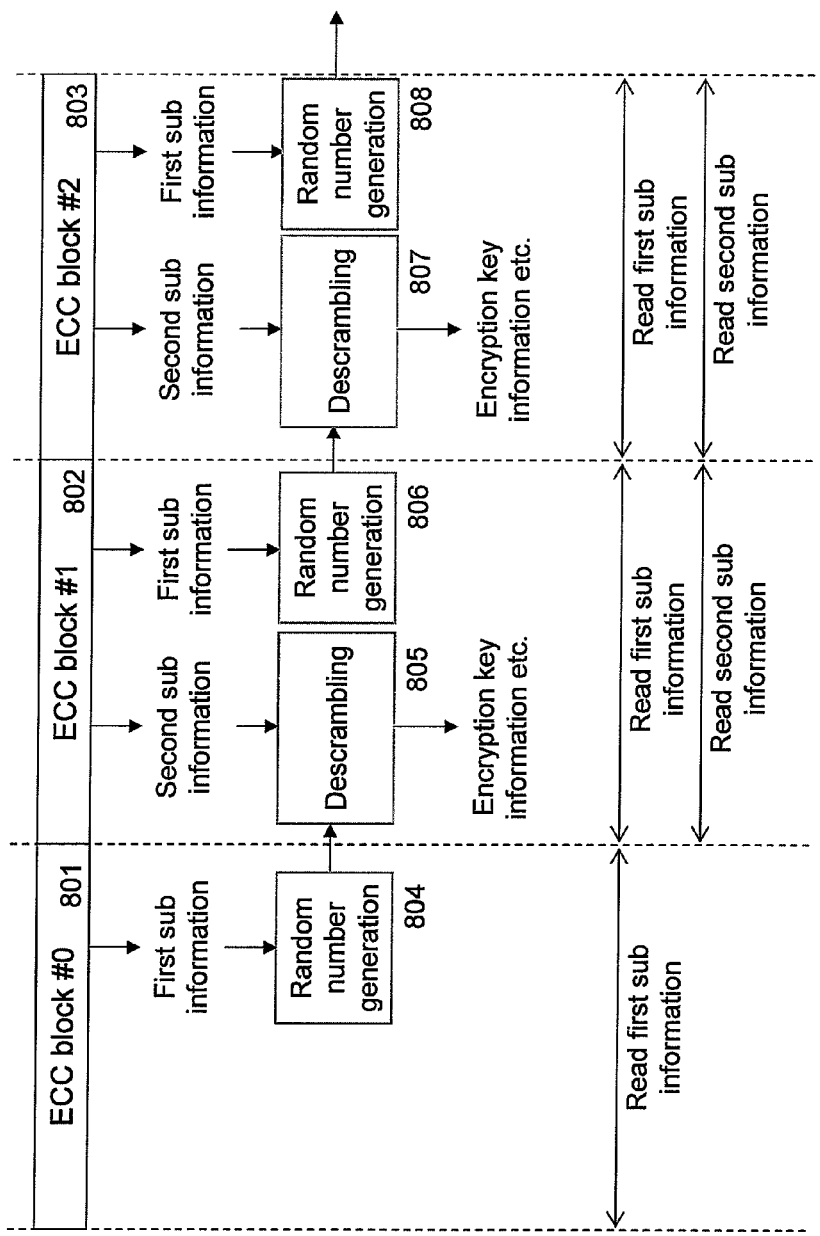
FIG. 8 is a flowchart showing a method for reading the second sub information from the optical disc.

FIG. 8 is a conceptual diagram showing a method for reading the first sub information and the second sub information from the optical disc of the present embodiment. In this example as well, the optical disc of the present embodiment is assumed to be a DVD-ROM.

As the recording format of the DVD-ROM is described with reference to FIG. 2, information is recorded onto the DVD-ROM in units of ECC blocks, each of which consists of 16 sectors each having a sector address and each including 26 frames to which synchronization codes are inserted in fixed cycles. The ECC blocks have been coded using error correction codes, and are arranged continuously on the track in the circumferential direction of the optical disc. In the present embodiment, ECC blocks #0 (801), #1 (802), and #2 (803) are arranged sequentially in the circumferential direction of the optical disc.

On the optical disc according to the present embodiment, the first sub information has already been recorded by altering the ID codes of the synchronization codes of the frames. As described with reference to FIG. 4, in the present embodiment, the 32-bit information indicating the scrambling initial value of the second sub information, together with the 16-bit error correction parity using the Reed-Solomon codes, is recorded in the eight sectors, or specifically the first to eighth sectors, of each ECC block. Also, the 32-bit information indicating the recording start position of the second sub information, together with the 16-bit error correction parity using the Reed-Solomon codes, is recorded in the eight sectors, or specifically the ninth to sixteenth sectors, of each ECC block.

Further, the second sub information has been recorded on the optical disc by lowering the reflectivity of the reflective film at positions corresponding to the concave or convex recording marks through laser light irradiation and forming the reflectivity changing marks.

With the method for reading the first sub information and the second sub information from the optical disc according to the present embodiment, a playback apparatus (described later) first reads the ECC block #0 (801). Then, the playback apparatus obtains, as the first sub information, the scrambling initial value of the second sub information and the recording start position of the second sub information, which can be used to extract the second sub information recorded in the ECC block #1 (802). While reading the first sub information from the ECC block #0 (801), the apparatus can also read the main information including the content information.

When the ECC block #0 (801) is read completely, the ECC block #1 (802), which is continuous to the ECC block #0 (801) in the track direction, is read next. At the beginning position of the ECC block #1 (802), the scrambling initial value of the second sub information that has been read as the first sub information from the ECC block #0 (801) is set to be used by a random number generator (804). Subsequently, the ECC block #1 (802) is read until the current reading position reaches the recording start position of the second sub information that has been read as the first sub information from the ECC block #0 (801). When the current reading position reaches the recording start position, the second sub information is read from the ECC block #1 (802) and descrambled (805) using a random number sequence generated by the random number generator (804) to detect the encryption key information (scrambling-target information) etc. from the ECC block #1 (802). The first sub information that has been recorded in the ECC block #0 indicates the scrambling initial value and the recording start position of the second sub information to be read from the next ECC block, namely the ECC block #1 (802).

In the ECC block #1 (802), the first sub information that has been recorded in the ECC block #1 (802) is read while the second sub information is being read from the ECC block #1 (802). The first sub information that has been recorded in the ECC block #1 (802) indicates the scrambling initial value and the recording start position of the second sub information that is to be read from the ECC block #2 (803), which is continuous to the ECC block #1 (802). The first sub information has been recorded in the ECC block #1 (802) by altering the ID codes of the synchronization codes that are inserted in units of frames of the ECC block #1 (802) as shown in FIG. 3A.

When the first sub information is read completely from the ECC block #1 (802) and the second sub information is read completely from the ECC block #1 (802), the ECC block #2 (803), which is continuous to the ECC block #1 (802) in the track direction, is read next. At the beginning position of the ECC block #2 (803), the scrambling initial value of the second sub information that has been read as the first sub information from the ECC block #1 (802) is set to be used by a random number generator (806). Subsequently, the ECC block #2 (803) is read until the current reading position reaches the recording start position of the second sub information that has been read as the first sub information from the ECC block #1 (802). When the current reading position reaches the recording start position, the second sub information is read from the ECC block #2 (803) and descrambled (807) using a random number sequence generated by the random number generator 806 to detect the key information (scrambling-target information) etc. from the ECC block #2 (803). The first sub information that has been recorded in the ECC block #1 indicates the scrambling initial value and the recording start position of the second sub information that is to be read from the next ECC block, namely the ECC block #2 (803).

In the ECC block #2 (803), the first sub information that has been recorded in the ECC block #2 (803) is read while the second sub information is being read from the ECC block #2 (803). The first sub information that has been recorded in the ECC block #2 (803) indicates the scrambling initial value and the recording start position of the second sub information that is read from an ECC block (not shown) continuous to the ECC block #2 (803). The first sub information has been recorded in the ECC block #2 (803) by altering the ID codes of the synchronization codes that are inserted in units of frames of the ECC block #2 (803).

As described above, the optical disc has ECC blocks, which are the units for recording information, and the first sub information has been recorded onto the optical disc in units of ECC blocks by altering the ID codes of the synchronization codes for the frames. The first sub information indicates the scrambling initial value and the recording start position of the second sub information, which are used to record the second sub information into the next ECC block continuous to the currently processed ECC block in the track direction. In each ECC block, the second sub information and the first sub information are read simultaneously. The second sub information is recorded by locally lowering the reflectivity of the reflective film of the optical disc through irradiation of laser light having a changed intensity. The second sub information is read by detecting changes in the reflectivity that are different from the frequency elements corresponding to changes in the reflectivity of the concave or convex recording marks. The read second sub information is descrambled based on the random number sequence initialized using the scrambling initial value, which has been read as the first sub information from the immediately preceding ECC block. More specifically, the second sub information is read by detecting changes in the intensity of the reflected light in the readout waveform of the reflectivity changing marks formed on the reflective film and by starting the readout from the recording start position of the second sub information that has been read as the first sub information from the immediately preceding ECC block in the track direction.

In the present embodiment, the recording start position of the second sub information, which is recorded as the first sub information, is specifically a sector address at which the recording of the second sub information is to be started in an ECC block immediately following the ECC block from which the first sub information is read. The recording start position of the second sub information can therefore be changed in units of ECC blocks. This prevents a malicious third party from analyzing the second sub information in an unauthorized manner.

Although the present embodiment describes the case in which the recording start position of the second sub information, which is recorded as the first sub information, is specifically the sector address at which the recording of the second sub information is to be started in an ECC block immediately following the ECC block from which the first sub information is read, the present invention should not be limited to this structure. The recording start position of the second sub information may be a position deviating in channel bits from the beginning position of the ECC block from which the recording is to be started or a position of a frame from which the recording of the second sub information is to be started.

When the recording of the second sub information is started at the same recording start position in all ECC blocks, unauthorized analysis of the second sub information may be performed more easily. To prevent this, the present embodiment is designed to include any means for changing the recording start position of the second sub information in units of ECC blocks, which is included in the scope of the present invention.

In the present embodiment, both the first sub information and the second sub information are recorded in synchronization with the units of ECC blocks, or sectors or frames. This enables the first sub information and the second sub information to be read simultaneously with the main information, without requiring to use synchronization codes unique to the first sub information and the second sub information.

The first sub information and the second sub information are recorded with different methods. More specifically, the first sub information is recorded by altering the synchronization codes of the frames, whereas the second sub information is recorded by changing the reflectivity of the reflective film through laser light irradiation and forming the reflectivity changing marks. This enables the first sub information and the second sub information to be read simultaneously. As a result, although the two different sets of information, namely the first sub information and the second sub information, are recorded on the optical disc, the readout of the first sub information and the readout of the second sub information can be performed simultaneously without reducing the main information area of the optical disc and without unnecessarily increasing the time taken for recording the information.

To create a copy of this optical disc, both the altered synchronization codes and the changed reflectivity of the reflective film, which are not contained in the readout signals for the content, need to be copied onto another disc. Even when only the first sub information is successfully copied onto another disc, the disc, which fails to contain the second sub information including the encryption key information for the content, would have no value.

Even when only the second sub information recorded on the optical disc is successfully copied onto a different disc, the first sub information indicating the scrambling initial value used for reading the second sub information and the recording start position of the second sub information cannot be read from the created disc copy. In that case, the second sub information cannot be read from the disc. As a result, the content cannot be read from the disc.

To create an unauthorized copy of the optical disc, both the first sub information and the second sub information, which have been recorded onto the optical disc with different methods, not only need to be copied into the same area but also need to be copied simultaneously. This would be almost impossible for a third party who is not notified of the methods that have been used to record the first sub information and the second sub information. This structure enables copyright protection of content stored in an optical disc to be achieved with a level higher than conventional copyright protection.

Figure 9:
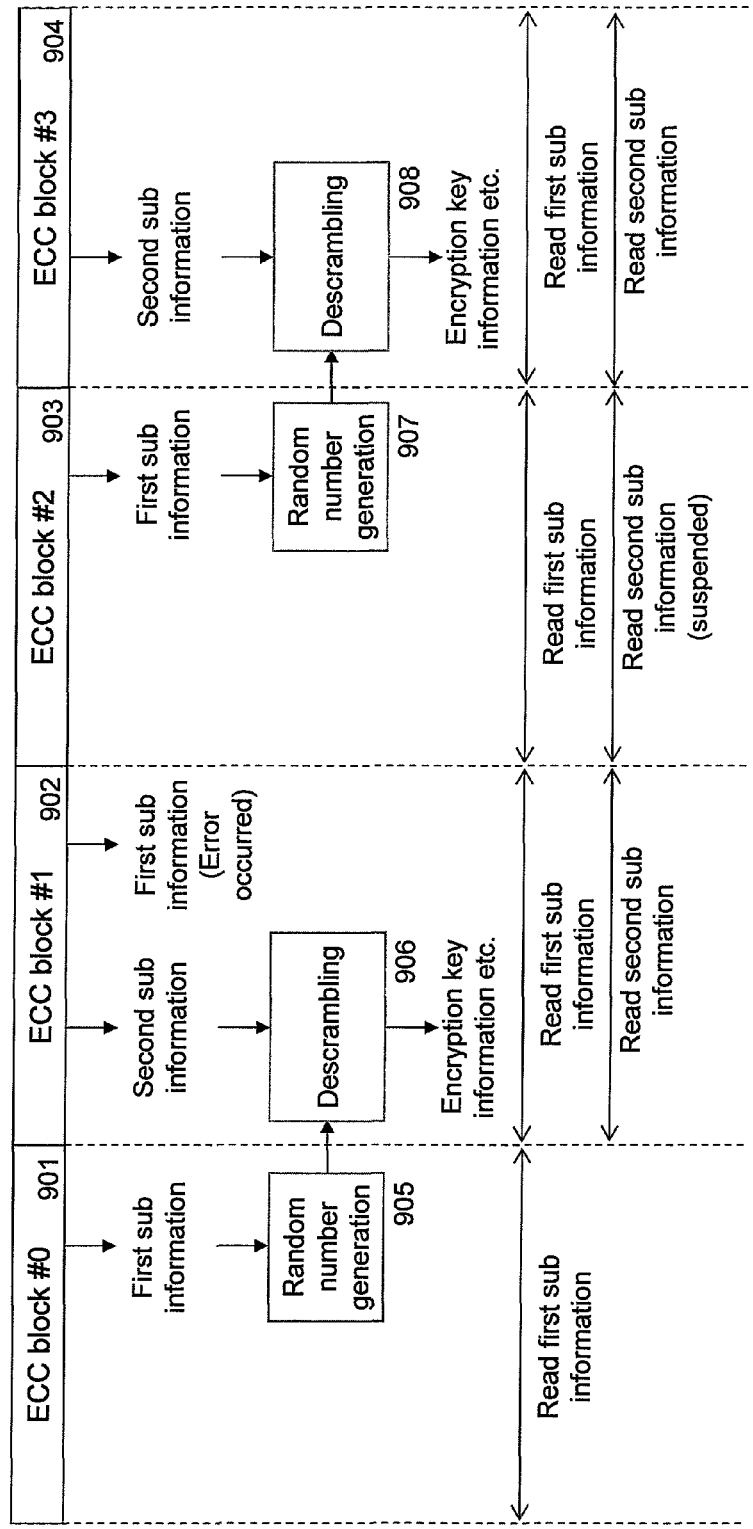
FIG. 9 is a flowchart showing a method for reading the second sub information from the optical disc.

FIG. 9 is a conceptual diagram showing a method for reading the first sub information and the second sub information from the optical disc according to the present embodiment in the same manner as in FIG. 8. FIG. 9 shows a procedure performed when an error occurs in reading the first sub information. In this example as well, the optical disc of the present embodiment is assumed to be a DVD-ROM.

In the present embodiment, the ECC block #0 (901), the ECC block #1 (902), the ECC block #2 (903), and the ECC block #3 (904) are arranged sequentially in the circumferential direction of the optical disc. FIG. 9 shows an example in which an error occurs in reading the first sub information from the ECC block #1 (902), and thus the second sub information is prohibited from being read from the ECC block #2 (903). The other processing that is not described in this example is the same as the processing described in the example shown in FIG. 8.

As in the example shown in FIG. 8, with the method for reading the first sub information and the second sub information from the optical disc of the present embodiment, a playback apparatus (described later) first reads the ECC block #0 (901). Then, as the first sub information, the scrambling initial value of the second sub information and the recording start position of the second sub information. While reading the first sub information from the ECC block #0 (901), the apparatus can also read the main information including the content information.

When the ECC block #0 (901) is read completely, the ECC block #1 (902), which is continuous to the ECC block #0 (901) in the track direction, is read next as in the example shown in FIG. 8. At the beginning position of the ECC block #1 (902), the scrambling initial value of the second sub information that has been read as the first sub information from the ECC block #0 (901) is set to be used by a random number generator (905). Subsequently, the ECC block #1 (902) is read until the current reading position reaches the recording start position of the second sub information that has been read as the first sub information from the ECC block #0 (901). When the current reading position reaches the recording start position, the second sub information read from the ECC block #1 (902) is descrambled (902) using a random number sequence generated by the random number generator (905) to detect the encryption key information (scrambling-target information) etc. The first sub information recorded in the ECC block #0 indicates the scrambling initial value and the recording start position of the second sub information that is to be read from the next ECC block, namely the ECC block #1 (902).

In the ECC block #1 (902), the first sub information that has been recorded in the ECC block #1 (902) is read while the second sub information is being read from the ECC block #1. The first sub information that has been recorded in the ECC block #1 (902) indicates the scrambling initial value and the recording start position of the second sub information that is to be read from the ECC block #2 (903), which is continuous to the ECC block #1 (902). The first sub information has been recorded in the ECC block #1 (902) by altering the ID codes of the synchronization codes that are inserted in units of frames of the ECC block #1 (902) as shown in FIG. 3A.

In the example shown in FIG. 9, a reading error is assumed to have occurred in reading the first sub information from the ECC block #1 (902), or more specifically in reading at least one of the scrambling initial value of the second sub information and the recording start position of the second sub information from the ECC block #1 (902). The first sub information has been coded using Reed-Solomon codes as shown in FIG. 5. The first sub information is subjected to error correction after the first sub information is completely read from the ECC block #1 (902). When errors that cannot be corrected are detected in the error correction, the state in which the information contains uncorrectable errors will be detected.

When the first sub information is read completely from the ECC block #1 (902) and the second sub information is read completely from the ECC block #1 (902), the ECC block #2 (903), which is continuous to the ECC block #1 (902) in the track direction, is read next. However, the first sub information that has been recorded in the ECC block #1 (902), which is to be used to read the second sub information recorded in the ECC block #2 (903), has not been read successfully due to a reading error or the like. In that case, the operation of reading the second sub information from the ECC block #2 (903) is suspended. The reading operation is suspended because the scrambling initial value and the reading start position of the second sub information that will be necessary to detect the encryption key etc. from the second sub information are unknown. In the present embodiment, the encryption key etc. are detected by detecting changes in the reflectivity through integration. When the scrambling initial value and or the recording start position are unknown, continuing the operation of detecting the encryption key etc. through integration may cause unintended integration, which can degrade the accuracy of the read encryption key information etc.

In the present embodiment, when the playback apparatus determines that the first sub information has not been read successfully from the immediately preceding ECC block after error correction, the apparatus suspends the operation for reading the second sub information, and holds the result of integration performed to read the second sub information from the immediately preceding ECC block. This enables the encryption key information etc. to be read in a stable manner.

Even when the first sub information has not been read successfully from the immediately preceding ECC block, namely the ECC block #1, the operation for reading the first sub information from the ECC block #2 is performed.

When the first sub information is read completely from the ECC block #2 (903), the ECC block #3 (904), which is continuous to the ECC block #2 (903) in the track direction, is read next. When the first sub information has been detected successfully from the immediately preceding ECC block, namely the ECC block #2 (903), the second sub information is read from the ECC block #3 (904) using the scrambling initial value and the recording start position that have been recorded as the first sub information in the ECC block #2 (903). The operation for reading the second sub information from the immediately preceding ECC block, namely the ECC block #2 (903) has been suspended. Thus, in order to continuously read the second sub information, the operation for reading the second sub information is resumed by performing integration using the integral that is used to read the second sub information from the ECC block #1 (902).

As described above, with the method for playing the optical disc of the present embodiment, the second sub information is read based on whether the first sub information has been read successfully from the immediately preceding ECC block. Even when an error occurs in reading the first sub information from the immediately preceding ECC block, this method prevents such an error from affecting the second sub information read from other ECC blocks.

Although the first sub information in the present embodiment has the parity bit for error correction using Reed-Solomon codes, which enables determination as to whether the first sub information has been read successfully as shown in FIG. 5, the present invention should not be limited to this structure. It is only required that the determination as to whether the read first sub information is correct be performed. Thus, error detection codes may be used instead of the error correction codes. When error detection codes are used, a detected error cannot be corrected. However, the use of error detection codes will eliminate redundant bits added for error correction, and thus reduce the number of redundant bits. Alternatively, the cyclic redundancy check (CRC) may be used. This modification will also have the same advantageous effects as the effects of the present embodiment.

Figure 10:
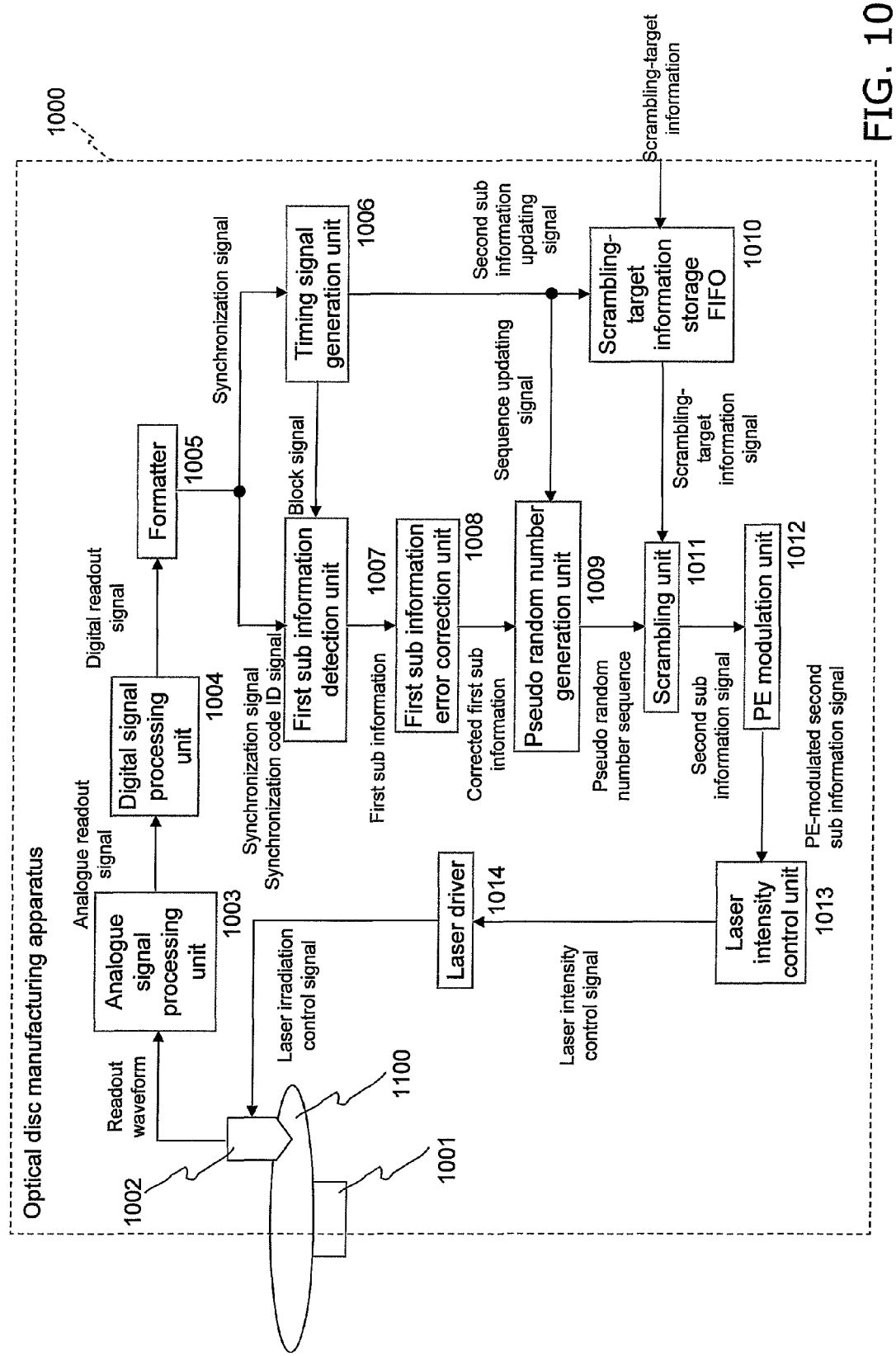
FIG. 10 is a block diagram showing the structure of an optical disc manufacturing apparatus according to the first embodiment.

1.3 Optical Disc Manufacturing Apparatus 1.3.1 Structure of the Optical Disc Manufacturing Apparatus FIG. 10 shows the structure of an apparatus for recording the second sub information on an optical disc 1100 according to the first embodiment of the present invention, or namely an optical disc manufacturing apparatus 1000. The optical disc manufacturing apparatus 1000 includes a spindle motor 1001, an optical head 1002, an analogue signal processing unit 1003, a digital signal processing unit 1004, a formatter 1005, a timing signal generation unit 1006, a first sub information detection unit 1007, a first sub information error correction unit 1008, a pseudo random number generation unit 1009, a scrambling-target information storage FIFO 1010, a scrambling unit 1011, a PE modulation unit 1012, a laser intensity control unit 1013, and a laser driver 1014.

As described above, the optical disc 1100 on which the second sub information is to be recorded is formed by transfer from the optical disc master on which the first sub information has been prerecorded, and then forming a protective layer and labeling etc. The first sub information has been recorded by altering the ID codes of the synchronization codes that are inserted in units of frames as shown in FIG. 3A. The first sub information indicates the scrambling initial value used to record the second sub information and the recording start position of the second sub information. In the present embodiment, the unique sub information is recorded in units of ECC blocks. The unique first sub information recorded in units of ECC blocks has been generated by, for example, subjecting sector addresses to data conversion, and has been recorded onto the optical disc master.

The method for recording the sub information by altering the synchronization codes is described in detail in, for example, Japanese Unexamined Patent Publication No. 2002-93060, and will not be described in detail herein.

The optical disc 1100 is mounted on the manufacturing apparatus, and then the spindle motor 1001 rotates the optical disc 1100 through designated rotation control (at a constant linear velocity (CLV) in this example).

The optical head 1002 irradiates the optical disc 1100, which is being rotated by the spindle motor 1001, with laser light, and obtains the readout waveform based on reflected light of the laser light, and outputs the obtained readout waveform to the analogue signal processing unit 1003.

The analogue signal processing unit 1003 amplifies or equalizes the readout waveform output from the optical head 1002 to generate an analogue readout signal, and outputs the analogue readout signal to the digital signal processing unit 1004.

The digital signal processing unit 1004 converts the analogue readout signal output from the analogue signal processing unit 1003 through analogue to digital conversion. The digital signal processing unit 1004 then operates its internal phase locked loop (PLL) circuit to generate a clock signal in synchronization with the readout signal. The digital signal processing unit 1004 digitizes the readout signal in synchronization with the clock signal to generate a digital readout signal, and outputs the generated digital readout signal to the formatter 1005.

The formatter 1005 detects the timings corresponding to synchronization codes that are inserted in fixed cycles from the digital readout signal output from the digital signal processing unit 1004. Based on the detected timings, the formatter 1005 divides the digital readout signal in units of frames, and demodulates the frame addresses using ID information of the synchronization codes to detect frame positions. The formatter 1005 then groups the frames into sectors, each of which consists of 26 frames according to the detected frame positions, and extracts sector addresses attached to the sectors. The formatter 1005 further groups the sectors into ECC blocks each consisting of 16 sectors according to the sector addresses, and performs error correction in units of ECC blocks to extract the main information in units of 32 KB. The formatter 1005 also generates a synchronization signal, which is a timing signal indicating the timing at which a synchronization code inserted in units of frames is detected, the beginning position of a sector, the address of a sector, and the beginning position of an ECC block, and outputs the generated signal to the timing signal generation unit 1006 and the first sub information detection unit 1007. The formatter 1005 also generates a synchronization code ID signal indicating the type of an ID code of a synchronization code that is inserted in units of frames, and outputs the synchronization code ID signal to the first sub information detection unit 1007.

The timing signal generation unit 1006 generates a block signal indicating the position of an ECC block from which the first sub information is to be read based on the timing signal provided from the formatter 1005, and outputs the generated signal to the first sub information detection unit 1007. The position of the ECC block from which the first sub information is to be read is indicated using a sector address, and is designated by a system controller (not shown) in the present embodiment. The readout position of the first sub information set by the system controller may be a predetermined address, or may be a value indicating the recording position obtained by playing back the optical disc in advance and stored in a control area of the optical disc. The control area may be included in a burst cutting area (BCA), in which information is recorded as marks in the form of a bar code by removing the corresponding portions of the reflective film with laser light irradiation.

The timing signal generation unit 1006 outputs a sequence updating signal at every predetermined timing to the pseudo random number generation unit 1009, which is used for recording the second sub information. The timing signal generation unit 1006 also outputs a second sub information updating signal indicating the timing at which bits of the second sub information to be recorded at every predetermined timing are transmitted. In the present embodiment, the sequence updating signal is output at every $104^{th}$ channel bit in the 1456 channel bits of each frame excluding the synchronization code part (32 channel bits) at the beginning of the frame. This means that the sequence updating signal is output 14 times per frame. The second sub information updating signal is output at every third frame in the 24 frames of each sector excluding the first frame (frame at the beginning of the sector) and the sixteenth frame (frame at the end of the sector) of the sector. This means that the second sub information updating signal is output eight times per sector. More specifically, with the recording format used in the present embodiment, 1-bit second sub information is recorded at every third frame, and consequently 8-bit second sub information is recorded in each sector and 128-bit second sub-information is recorded in each ECC block.

The first sub information detection unit 1007 detects the first sub information using the synchronization signal and the synchronization code ID signal, which are provided from the formatter 1005, based on the block signal indicating a block from which the first sub information is to be detected, which is provided from the timing signal generation unit 1006.

In the present embodiment, the first sub information is recorded in the manner described with reference to FIG. 4, and 48-bit information consisting of the 32-bit sub information and the 16-bit Reed-Solomon parity bit is recorded in each of the first area, which consists of the first to eight sectors, and the second area, which consists of the ninth to sixteenth sectors, within the ECC block. As described above, the scrambling initial value used to record the second sub information is recorded in the first area, whereas the recording start position of the second sub information is recorded in the second area. The scrambling initial value and the recording start position of the second sub information serve as the first sub information. The first sub information is recorded using either altered or unaltered ID codes of the synchronization codes in the fourth, eighth, twelfth, sixteenth, twentieth, and twenty fourth frames in the first to twenty sixth frames within the sector, to the abnormal pattern SY8, which is not included in a normal disc as described with reference to FIGS. 3A and 3B. For the altered code having the pattern SY8, the bit value of 1 is extracted as the first sub information bit. For the unaltered code, the bit value of 0 is extracted as the first sub information bit. The resulting 6-bit first sub information is recorded into the single frame.

The first sub information detection unit 1007 detects the frame addresses from the synchronization codes at the timing indicated by the block signal, which has been generated to indicate the detection timing of the first sub information based on the timing signal. The first sub information detection unit 1007 detects the first sub information by determining whether the ID codes of the synchronization codes of the fourth, eighth, twelfth, sixteenth, twentieth, and twenty fourth frames have been altered to the pattern SY8. The first sub information detection unit 1007 outputs the detected first sub information to the first sub information error correction unit 1008.

The first sub information error correction unit 1008 subjects the first sub information detected by the first sub information detection unit 1007 to error correction. As shown in FIG. 5, the scrambling initial value of the second sub information and the recording start position information of the second sub information, which serve as the first sub information, are coded using Reed-Solomon codes. The first sub information error correction unit 1008 subjects the first sub information to error correction and generates corrected first sub information, and outputs the corrected first sub information to the pseudo random number generator 1009.

The first sub information error correction unit 1008 receives the detected entire 96-bit first sub information in units of ECC blocks from the first sub information detection unit 1007. The first sub information detection unit 1007 clears the first sub information that has been stored internally when outputting the detected first sub information to the first sub information error correction unit 1008, and newly performs the operation for detecting the first sub information from the subsequent ECC blocks in the track direction.

The pseudo random number generation unit 1009 generates a pseudo random number sequence using, as an initial value, the corrected first sub information generated by the first sub information error correction unit 1008. The pseudo random number generation unit 1009 outputs, to the scrambling unit 1011, a single bit of the pseudo random number sequence generated at every timing when the sequence updating signal is output from the timing signal generation unit 1006. The pseudo random number generation unit 1009 is formed by a typical M-sequence generator including a feedback shift register. The initial value indicated by the first sub information is set in the shift register at the beginning position of the ECC block into which the second sub information is recorded. The random number sequence is updated by shifting the shift register by a single bit at every timing when the sequence updating signal is output from the timing signal generation unit 1006. As described above, the sequence updating signal is output from the timing signal generation unit 1006 at every $104^{th}$ channel bit for the 1456 channel bit length of the frame excluding the 32 channel bits of the synchronization code part 32 of the frame. In the present embodiment, a single bit of the pseudo random number sequence is generated and output to the scrambling unit 1011 for every $104^{th}$ channel bit. The pseudo random number generation unit 1009 starts generating the pseudo random number sequence at the beginning of the sector indicated by the recording start position of the second sub information, which is recorded as the first sub information.

The scrambling-target information storage FIFO 1010 is a first-in, first-out (FIFO) stack. The scrambling-target information storage FIFO 1010 stores the scrambling-target information provided in advance from a system controller (not shown), which is information obtained by concatenating the encryption key information and the disc identification information. A single bit of the scrambling-target information stored in the FIFO is output to the scrambling unit 1011 at every timing when the second sub information updating signal is output from the timing signal generation unit 1006. The second sub information updating signal is output from the timing signal generation unit 1006 at every third frame excluding the first frame (frame at the beginning of the sector) and the twenty sixth frame (frame at the end of the sector) of the sector corresponding to the recording start position of the second recording signal, which is detected as the first sub information by the first sub information detection unit 1007. In the scrambling-target information storage FIFO 1010, 1-bit information is selected for every third frame in accordance with the second sub information updating signal, and the selected 1-bit information is output to the scrambling unit 1011.

In the present embodiment, the scrambling unit 1011 is formed using an exclusive OR gate. The scrambling unit 1011 calculates an exclusive OR of a 1-bit signal that is output from the scrambling-target information storage FIFO 1010 for every third frame and a pseudo random number sequence that is output from the pseudo random number generation unit 1009 for every $104^{th}$ channel bit. As a result, the scrambling unit 1011 generates a second sub information signal through scrambling (spread spectrum), and outputs the generated signal to the PE modulation unit 1012.

The PE modulation unit 1012 modulates the second sub information output from the scrambling unit 1011 by phase encoding (PE). When the second sub information indicates the bit value of 1, the PE modulation unit 1012 sets the bit length of the first half 52 channel bits of the 104 channel bits to a high (H) level and the latter half 52 channel bits to a low (L) level to generate a PE-modulated second sub information signal. When the second sub information indicates the bit value of 0, the PE modulation unit 1012 sets the bit length of the first half 52 channel bits of the 104 channel bits to L and the latter half 52 channel bits to H to generate a PE-modulated second sub information signal. The generated PE-modulated second sub information signal is output to the laser intensity control unit 1013.

The laser intensity control unit 1013 generates a laser intensity control signal for controlling the laser intensity, and outputs the generated signal to the laser driver 1014. The laser intensity control unit 1013 sets the intensity of laser light used to irradiate the optical disc 1100 higher than the readout level when the PE-modulated second sub information signal output from the PE modulation unit 1012 is at a H level. The laser intensity control unit 1013 maintains the intensity of the laser light at the readout level when the PE-modulated second sub information signal is at a L level.

The laser driver 1014 drives a laser oscillator that irradiates the optical disc with laser light. The laser driver 1014 irradiates the optical disc 1100 with laser light having an intensity controlled in accordance with a laser intensity control signal. As described with reference to FIG. 6, the optical disc 1100 is irradiated with laser light having an intensity higher than the normal readout level when the PE-modulated second sub information signal is at a H level. In this case, the reflective film irradiated with the laser light deteriorates to form the reflectivity changing marks, which have lower reflectivity. The second sub information is recorded as the reflectivity changing marks.

1.3.2 Characteristics of the Optical Disc Manufacturing Apparatus

As described above, the optical disc manufacturing apparatus 1000 of the present embodiment reads the first sub information based on whether the synchronization codes inserted in units of frames have been altered in the preset recording areas of the first sub information. The optical disc manufacturing apparatus 1000 sets the scrambling initial value, which has been recorded as the first sub information, to be used by the pseudo random number generation unit at the beginning position of an ECC block that is continuous to the currently processed ECC block, from which the first sub information has been read, in the direction of the track, and also records the second sub information one bit at a time from the recording start position of the second sub information, which has been recorded as the first sub information. As described above, the second sub information is recorded after the information is scrambled using the pseudo random number sequence generated using the scrambling initial value, which has been recorded as the first sub information read from the immediately preceding ECC block, and the scrambled information is then modulated by phase encoding. Also, while the second sub information is being recorded, the apparatus performs the operation for detecting the first sub information that is used to record the second sub information into an ECC block immediately following the currently processed ECC block in which the second sub information is being recorded.

In the present embodiment, the second sub information is not recorded in the synchronization code part of the frame. This is due to the following reason. To record the second sub information in the synchronization code part of the frame, the synchronization code part needs to be irradiated with laser light having an intensity higher than the normal readout level. However, if the synchronization code part is irradiated with laser light having an intensity other than the normal readout level, the altered ID information of the synchronization codes may fail to be read in a stable manner. This may disable the first sub information to be detected successfully. To avoid this, the second sub information is not recorded in the synchronization code part of the frame. This enables the first sub information, which has been recorded by altering the synchronization codes, to be read, while enabling the second sub information, which requires laser light irradiation having an intensity higher than the normal readout level, to be recorded.

In the present embodiment, the second sub information is not recorded in the first frame (frame at the beginning of the sector) and the twenty sixth frame (frame at the end of the sector) of the sector. This is because a sector address is recorded in the first frame of each sector in a DVD-ROM. In the present embodiment, laser light irradiation having an intensity higher than the normal readout level to form the reflectivity changing marks having changed reflectivity is not performed in the first frame, in which the sector address is recorded, and in the twenty sixth frame, which is a frame immediately preceding the first frame of the next sector. This enables the playback apparatus for the optical disc to read the sector addresses in a stable manner.

Figure 11:
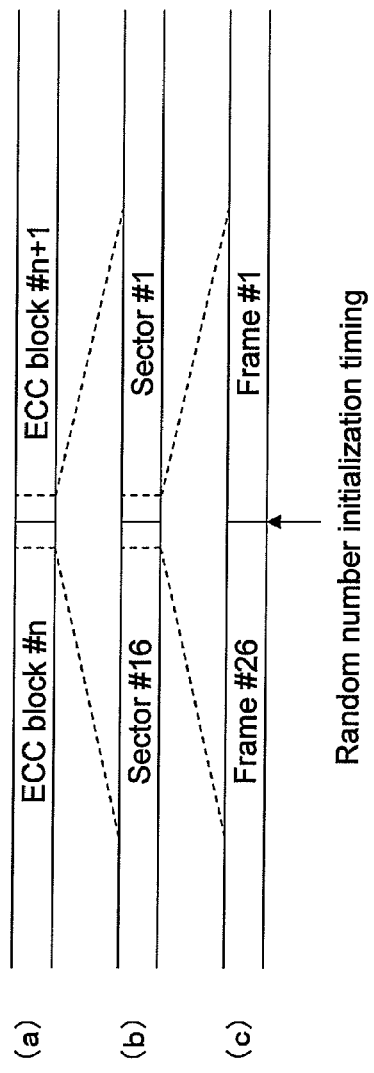
FIGS. 11(*a*) to 11(*c*) show the timing at which a random number sequence is initialized by the optical disc manufacturing apparatus.

FIGS. 11(*a*) to 11(*c*) are timing charts showing the specific timing at which the initial value that has been detected as the first sub information is set to be used by the pseudo random number generation unit 1009 for recording the second sub information in the optical disc manufacturing apparatus 1000 of the present embodiment described with reference to FIG. 10 when the optical disc manufacturing apparatus 1000 records the second sub information.

FIG. 11(*a*) shows ECC blocks that are continuous to each another in the track direction of the optical disc on which the second sub information is to be recorded. More specifically, FIG. 11(*a*) shows an ECC block #n and its immediately following ECC block #n+1. In the present embodiment, the scrambling initial value and the recording start position of the second sub information that is to be recorded into the ECC block #n+1 are detected from the ECC block #n as the first sub information. Based on the detected first sub information, the second sub information is recorded into the ECC block #n+1.

FIG. 11(*b*) shows a boundary between the ECC blocks #n and #n+1 shown in FIG. 11(*a*). At the boundary between the two blocks, a sector #16, which is the last sector of the ECC block #n, and a sector #1, which is the first sector of the ECC block #n+1, are arranged adjacent to each other as well as continuous to each other.

FIG. 11(*c*) shows a boundary between the sectors #16 and #1 shown in FIG. 11(*b*). At the boundary between the two sectors, a frame #26, which is the last frame of the ECC block #n, and a frame #1, which is the first frame of the ECC block #n+1, are arranged adjacent to each other as well as continuous to each other. When the last frame of the ECC block #n is to be read, the first sub information recorded in the ECC block #n has already been read completely. The scrambling initial value read as the first sub information from the ECC block #n is set to be used by the pseudo random number generation unit 1009 at the beginning position of the ECC block #n+1. The set scrambling initial value is then used to generate a pseudo random number sequence.

In the present embodiment, the second sub information is not recorded in the first frame of the sector. Thus, the scrambling initial value may be set at any timing within the frame #1 of the sector #1 included in the ECC block #n+1.

Although the second sub information is recorded into the first sector of the ECC block #n+1 and subsequent sectors, the recording may be started from a sector corresponding to the recording start position of the second sub information for the ECC block #n+1, which is recorded in the ECC block #n as the first sub information.

1.3.3 Operation of the Optical Disc Manufacturing Apparatus

Figure 12:
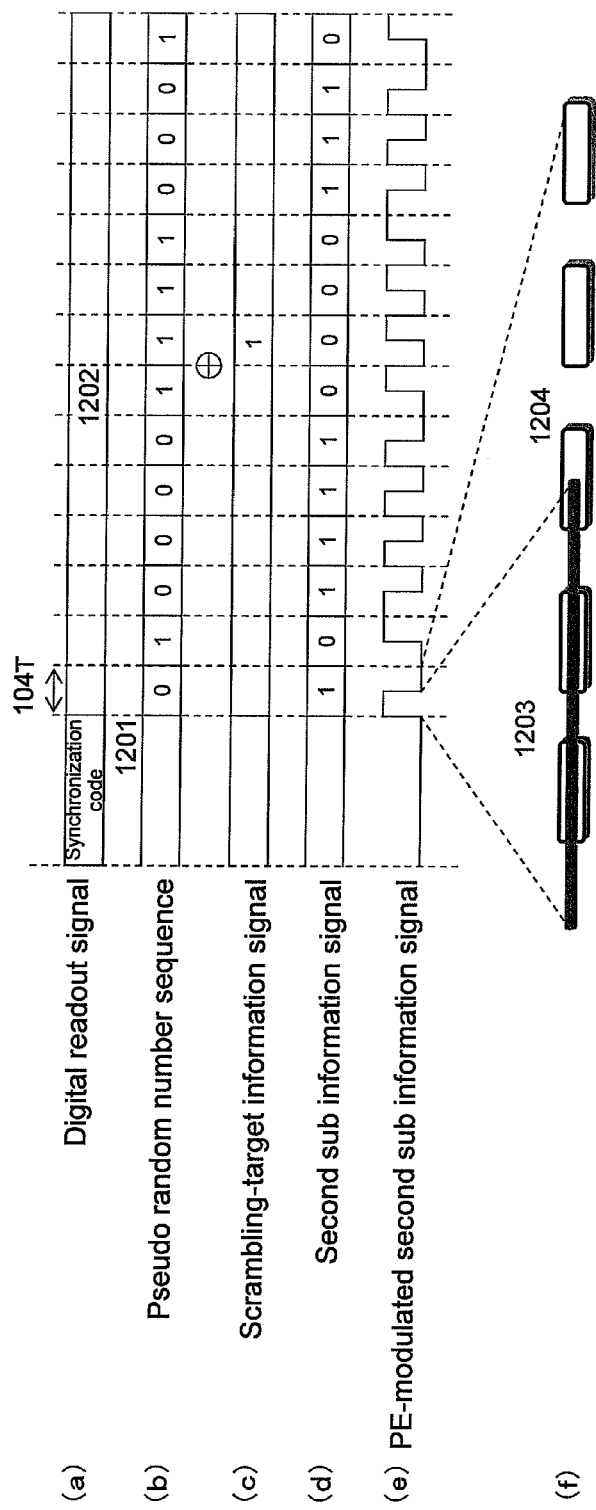
FIGS. 12(*a*) to 12(*f*) are timing charts showing the operation of the optical disc manufacturing apparatus.

FIGS. 12(*a*) to 12(*f*) are timing charts showing the unique operation of the optical disc manufacturing apparatus shown in FIG. 10.

FIG. 12(*a*) shows a digital readout signal output from the digital signal processing unit 1004 to the formatter 1005, and specifically shows a frame readout signal having a synchronization code 1201, which is inserted in units of frames, and a data code part 1202.

FIG. 12(*b*) shows a pseudo random number sequence that is generated by the pseudo random number generation unit 1009. The pseudo random number sequence is output one bit at a time in accordance with a sequence updating signal provided from the timing signal generation unit 1006. The sequence updating signal is output for every $104^{th}$ channel bit of the data code part of the frame, which is the part of the frame excluding the synchronization code part. In the example of FIG. 12(*b*) as well, a single bit of the pseudo random number sequence is output for every $104^{th}$ channel bit of the data code part of the frame excluding the synchronization code part.

FIG. 12(*c*) shows a scrambling-target information signal that is output from the scrambling-target information storage FIFO 1010 to the scrambling unit 1011. The scrambling-target information signal is output one bit at a time in accordance with a second sub information updating signal provided from the timing signal generation unit 1006. The second sub information updating signal is output for every third frame in the frames of the sector excluding the first frame and the twenty sixth frame. As a result, the scrambling-target information signal is updated for every third frame and is output one bit at a time.

FIG. 12(*d*) shows a second sub information signal that is output from the scrambling unit 1011 to the PE modulation unit 1012. The scrambling unit 1011 of the present embodiment generates the second sub information signal by scrambling the scrambling-target information signal using an exclusive OR of the input pseudo random number sequence (FIG. 12(*b*)) and the scrambling-target information signal (FIG. 12(*c*)).

FIG. 12(*e*) shows a PE-modulated second sub information signal, which is output from the PE modulation unit 1012 to the laser intensity control unit 1013. The PE modulation unit 1012 modulates the input second sub information (FIG. 12(*d*)) by phase encoding. When the second sub information indicates the bit value of 1, the PE modulation unit 1012 sets the first half 52-channel bits to H and the latter half 52-channel bits to L to generate a PE-modulated second sub information signal. When the second sub information indicates the bit value of 0, the PE modulation unit 1012 sets the first half 52-bit channel bit section to L and the latter half 52-channel bit section to H to generate a PE-modulated second sub information signal. The generated PE-modulated second sub information signal is output to the laser intensity control unit 1013. The optical disc is irradiated with laser light based on the PE-modulated second sub information signal to record the second sub information onto the optical disc.

FIG. 12(*f*) shows the surface details of the optical disc on which the second sub information has been recorded. In the H-level section 1203 of the PE-modulated second sub information signal (FIG. 12(*e*)), the optical disc is irradiated with laser light having an intensity higher than the normal readout level to form reflectivity changing marks having lower reflectivity of the reflective film. In the L-level section 1204 of the PE-modulated second sub information signal (FIG. 12(*e*)), which is provided from the PE modulation unit 1012, the optical disc is irradiated with laser light having the normal readout level so that the reflectivity of the reflective film remains unchanged. Through this laser light irradiation, the second sub information is recorded.

Figure 13:
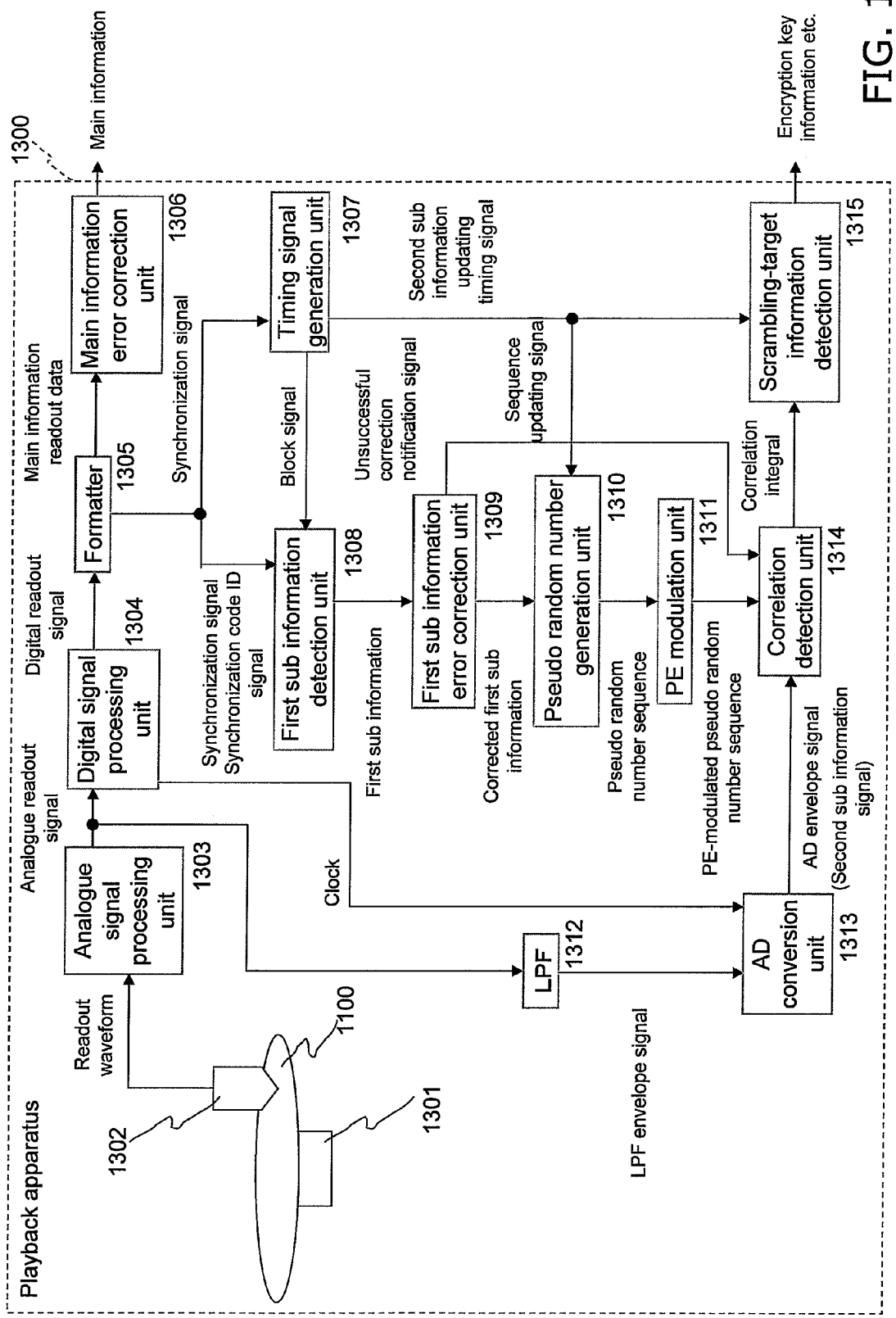
FIG. 13 is a block diagram showing the structure of an optical disc playback apparatus according to the first embodiment.

1.4. Optical Disc Playback Apparatus 1.4.1 Structure of the Optical Disc Playback Apparatus FIG. 13 shows the structure of an optical disc playback apparatus 1300 for playing the optical disc 1100 of the first embodiment on which the first sub information and the second sub information have been recorded. The optical disc playback apparatus 1300 includes a spindle motor 1301, an optical head 1302, an analogue signal processing unit 1303, a digital signal processing unit 1304, a formatter 1305, a main information error correction unit 1306, a timing signal generation unit 1307, a first sub information detection unit 1308, a first sub information error correction unit 1309, a pseudo random number generation unit 1310, a PE modulation unit 1311, an LPF 1312, an AD conversion unit 1313, a correlation detection unit 1314, and a scrambling-target information detection unit 1315. The optical head 1302, the analogue signal processing unit 1303, the digital signal processing unit 1304, the formatter 1305, and the main information error correction unit 1306 form a main information readout unit that irradiates the concave or convex recording marks of the optical disc and reads the main information based on reflected light elements from the concave or convex recording marks included in the reflected light of the laser light irradiation. The LPF 1312 and the AD conversion unit 1313 form a second sub information readout unit that reads the second sub information. The pseudo random number generation unit 1310, the PE modulation unit 1311, the correlation detection unit 1314, and the scrambling-target information detection unit 1315 form a testing unit that detects the correlation, or in other words the association between the first sub information and the second sub information, and outputs the encryption key information etc. that are used to read the main information based on the detection result.

The optical disc 1100 of the present embodiment on which the first sub information and the second sub information have been recorded is mounted on the playback apparatus, and then the spindle motor 1310 rotates the optical disc 1100 through CLV rotation control.

The optical head 1302 irradiates the optical disc 1100, which is being rotated by the spindle motor 1301, with laser light, and extracts the readout waveform based on reflected light of the laser light, and outputs the extracted readout waveform to the analogue signal processing unit 1303.

The analogue signal processing unit 1303 amplifies or equalizes the readout waveform output from the optical head 1302 to generate an analogue readout signal, and outputs the analogue readout signal to the digital signal processing unit 1304 and the LPF 1312.

The digital signal processing unit 1304 converts the analogue readout signal input from the analogue signal processing unit 1303 through analogue to digital conversion. The digital signal processing unit 1304 then operates its internal PLL circuit to generate a clock signal in synchronization with the readout signal. The digital signal processing unit 1304 digitizes the readout signal in synchronization with the clock signal to generate a digital readout signal, and outputs the generated digital readout signal to the formatter 1305.

The formatter 1305 detects the synchronization codes that are inserted in fixed cycles from the digital readout signal output from the digital signal processing unit 1304. Based on the detected timings, the formatter 1305 divides the digital readout signal in units of frames, and extracts the frame addresses using the ID codes of the synchronization codes. The formatter 1305 then groups the frames into sectors each of which has a sector address and consists of 26 frames. The digital readout signal is further divided in units of ECC blocks, which are coded using error correction codes, according to the sector addresses provided to the sectors. The formatter 1305 then outputs, as main information readout data, the digital readout signal that has been divided in units of ECC blocks to the main information error correction unit 1306. The formatter 1305 also generates a synchronization signal, which is a timing signal indicating the timing at which a synchronization code inserted in units of frames is detected, the address of a sector, and the beginning position of an ECC block, and outputs the generated signal to the timing signal generation unit 1307 and the first sub information detection unit 1308. The formatter 1305 also generates a synchronization code ID signal after detecting an ID code of a synchronization code that is inserted in units of frames, and outputs the synchronization code ID signal to the first sub information detection unit 1308.

The main information error correction unit 1306 subjects the main information to error correction performed in units of ECC blocks based on the main information readout data provided from the formatter 1305, and extracts 32-KB user data as the main information, and outputs the extracted main information to, for example, an image processing block or a personal computer (not shown).

The timing signal generation unit 1307 generates a block signal indicating a timing for an ECC block from which the first sub information is to be read based on the synchronization signal provided from the formatter 1305, and outputs the generated signal to the first sub information detection unit 1308. The position of the ECC block from which the first sub information is to be read is designated by a system controller (not shown). The recording position of the first sub information may be a predetermined common address, a sector address read from a control area of the optical disc, or a sector address read from a BCA of the optical disc.

The timing signal generation unit 1307 outputs a sequence updating signal indicating the timing at which a pseudo random number sequence generated by the pseudo random number generation unit 1310 is to be updated in accordance with the input synchronization signal, and outputs the sequence updating signal to the pseudo random number generation unit 1310. The sequence updating signal is output for every $104^{th}$ channel bit of the 1456-channel bit data code part of the frame, which is the part of the frame excluding the synchronization code part (the first 32-channel bits). In this case, the sequence updating signal is output 14 times per frame.

The timing signal generation unit 1307 also outputs a second sub information updating timing signal to the scrambling-target information detection unit 1315 in accordance with the input synchronization signal. In the present embodiment, 1-bit sub information is recorded for every third frame in the 24 frames of the sector excluding the first frame (frame at the beginning of the sector) and the twenty sixth frame (frame at the end of the sector) of the sector. To enable this, the second sub information updating timing signal is output for every third frame.

The first sub information detection unit 1308 detects the first sub information using the synchronization signal and the synchronization code ID signal, which are provided from the formatter 1305, based on the block signal indicating a block from which the first sub information is to be detected, which is provided from the timing signal generation unit 1307.

In the present embodiment, the first sub information is recorded in the manner described with reference to FIG. 4, and 48-bit information consisting of the 32-bit sub information and the 16-bit Reed-Solomon parity bit is recorded in each of the first area, which consists of the first to eighth sectors of the ECC block, and the second area, which consists of the ninth to sixteenth sectors, within the ECC block. As described above, the scrambling initial value used to record the second sub information and the recording start position of the second sub information are recorded in the first area. The scrambling initial value and the recording start position of the second sub information serve as the first sub information. The first sub information is recorded using either altered or unaltered ID codes of the synchronization codes in the fourth, eighth, twelfth, sixteenth, twentieth, and twenty fourth frames in the first to twenty sixth frames within the sector, to the abnormal pattern SY8, which is not included in a normal disc as described above with reference to FIGS. 3A and 3B. For the altered code having the pattern SY8, the bit value of 1 is extracted as the first sub information bit. For the unaltered code, the bit value of 0 is extracted as the first sub information bit. The resulting 6-bit first sub information is recorded into the frame.

The first sub information detection unit 1007 detects the frame addresses from the synchronization codes at the timing indicated by the block signal, which indicates the detection timing of the first sub information and has been generated based on the timing signal. The first sub information detection unit 1007 detects the first sub information by determining whether the ID codes of the synchronization codes of the fourth, eighth, twelfth, sixteenth, twentieth, and twenty fourth frames have been altered to the pattern SY8. The first sub information detection unit 1007 outputs the detected first sub information to the first sub information error correction unit 1309.

The first sub information error correction unit 1309 subjects the first sub information detected by the first sub information detection unit 1308 to error correction. As shown in FIG. 5, the scrambling initial value of the second sub information and the recording start position information of the second sub information, which serve as the first sub information, are coded using Reed-Solomon codes. The first sub information error correction unit 1309 subjects the first sub information to error correction and generates corrected first sub information, and outputs the corrected first sub information to the pseudo random number generator 1310. When the first sub information contains many errors that cannot be corrected, or when the error correction has been unsuccessful, the first sub information error correction unit 1309 detects the state in which the information contains uncorrectable errors or the state in which the error correction has been unsuccessful, and outputs an unsuccessful correction notification signal indicating that state to the correlation detection unit 1314.

The first sub information error correction unit 1309 receives the detected entire 96-bit first sub information in units of ECC blocks from the first sub information detection unit 1308. The first sub information detection unit 1308 clears the first sub information that has been stored internally when outputting the detected first sub information to the first sub information error correction unit 1309, and newly performs the operation for detecting the first sub information from the subsequent ECC blocks in the track direction.

The pseudo random number generation unit 1310 generates a pseudo random number sequence using, as an initial value, the corrected first sub information generated by the first sub information error correction unit 1309. The pseudo random number generation unit 1310 outputs, to the PE modulation unit 1311, a single bit of the pseudo random number sequence generated at every timing when the sequence updating signal is output from the timing signal generation unit 1307.

The pseudo random number generation unit 1310 has the same structure as the pseudo random number generation unit 1009 included in the optical disc manufacturing apparatus 1000 described with reference to FIG. 10. The pseudo random number generation unit 1310 and the pseudo random number generation unit 1009 generate the same pseudo random number when using the same initial value.

The PE modulation unit 1311 modulates the pseudo random number sequence input from the pseudo random number generation unit 1310 by phase encoding (PE). When the input pseudo random number sequence indicates the value of 1, the PE modulation unit 1311 sets the bit length of the first half 52 channel bits of the 104 channel bits to 1 and the latter half 52 channel bits to 0 to generate a PE-modulated pseudo random number sequence signal. When the pseudo random number sequence indicates the value of 0, the PE modulation unit 1311 sets the bit length of the first half 52 channel bits to 0 and sets the latter half 52 channel bits to 1 to generate a PE-modulated pseudo random number sequence signal. The generated PE-modulated pseudo random number sequence signal is output to the correlation detection unit 1314.

The LPF 1312 is a typical low pass filter that passes low-frequency elements. The LPF 1312 generates an LPF envelope signal by extracting only low-frequency elements of the analogue readout signal that is output from the analogue signal processing unit 1303, and outputs the generated signal to the AD conversion unit 1313.

In the present embodiment, the second sub information that has been scrambled in cycles of 104 channel bits is modulated by phase encoding and the modulated second sub information is recorded. Thus, the cut-off frequency of the LPF 1312 should be a frequency at which signals having the 104-channel bit cycles can be extracted in a stable manner. The channel-bit frequency of a normal-speed DVD is about 26 MHz. Thus, the cut-off frequency of the LPF 1312 may be set, for example, to a frequency higher than 250 kHz. In this manner, the cut-off frequency of the LPF 1312 is calculated in a manner to fall within the recording bandwidth of the scrambled sub information.

The AD conversion unit 1313 converts the LPF envelope signal, which is provided from the LPF 1312, through analogue-to-digital conversion in synchronization with a clock signal provided from the digital signal processing unit 1304 to generate an AD envelope signal, and outputs the generated signal to the correlation detection unit 1314.

The correlation detection unit 1314 detects the correlation between the AD envelope signal (FIG. 14(g)), which is output from the AD conversion unit 1313, and the PE-modulated pseudo random number sequence (FIG. 14(c)), which is output from the PE modulation unit 1311, through integration. More specifically, when the input PE-modulated pseudo random number sequence indicates the value of 0, the correlation detection unit 1314 integrates the correlation value to the positive side if the input AD envelope signal indicates the value of 0, and integrates the correlation value to the negative side if the input AD envelope signal indicates the value of 1. When the input PE-modulated pseudo random number sequence indicates the value of 1, the correlation detection unit 1314 integrates the correlation value to the positive side if the input AD envelope signal indicates the value of 1, and integrates the correlation value to the negative side if the input AD envelope signal indicates the value of 0. As a result, the correlation detection unit 1314 integrates the correlation between the PE-modulated pseudo random number sequence and the AD envelope signal, and generates a correlation integral signal indicating the integral. The correlation detection unit 1314 outputs the correlation integral signal to the scrambling-target information detection unit 1315.

The correlation detection unit 1314 may receive an unsuccessful correction notification signal that is output from the first sub information error correction unit 1309 when the error correction performed for the first sub information has been unsuccessful. In this case, the correlation detection unit 1314 suspends the operation for integrating the correlation. The unsuccessful correction notification signal input from the first sub information error correction unit 1309 is output during the period in which the next ECC block, which follows the ECC block from which the first sub information has been read, is being processed, or more specifically while the ECC block from which the second sub information is to be read based on the random number initial value and the recording start position that have been read as the first sub information is being processed. When receiving the unsuccessful correction notification signal, the correlation detection unit 1314 suspends the operation for integrating the correlation to read the second sub information. This prevents the random number initial value and the recording start position from being input erroneously, and the correlation from being integrated in an unintended direction, and prevents the accuracy of the read second sub information from being degraded.

The scrambling-target information detection unit 1315 detects bits of the scrambling-target information (encryption key information and disc ID information) based on the correlation integral signal, which is provided from the correlation detection unit 1314, in accordance with the second sub information updating timing signal, which is provided from the timing generator 1307. As described above, the second sub information updating timing signal provided from the timing signal generation unit 1307 is output for every third frame. The scrambling-target information detection unit 1315 determines whether the correlation integral signal, which indicates the correlation integral between the PE-modulated pseudo random number sequence and the AD envelope signal calculated by the correlation detection unit 1314, indicates either a positive value or a negative value at the timing when the second sub information updating timing signal is output. When the correlation integral signal indicates a positive value, the bit value of 1 is output as the scrambling-target information bit. When the correlation integral signal indicates a negative value, the bit value of 0 is output as the scrambling-target information bit. As a result, a single bit of the scrambling-target information is read for every third frame in accordance with the second sub information updating timing signal that is output for every third frame. The resulting 8-bit scrambling-target information is detected for each sector, and the resulting 128-bit scrambling-target information is detected for each ECC block.

The scrambling-target information detection unit 1315 may internally have a positive-side threshold and a negative-side threshold. In this case, the scrambling-target information detection unit 1315 may extract the bit value of 1 only when the integral is greater than or equal to the positive-side threshold, and may extract the bit value of 0 only when the integral is less than or equal to the negative-side threshold. When the integral falls within a range between the positive-side threshold and the negative-side threshold, the scrambling-target information detection unit 1315 may determine that a reading error has occurred at the bit position.

Although not shown, the optical disc playback apparatus 1300 further includes a DEMUX for separating the scrambling-target information output from the scrambling-target information detection unit 1315 and a decryption unit for decrypting the main information using the obtained encryption key information.

1.4.2 Characteristics of the Optical Disc Playback Apparatus

As described above, the optical disc playback apparatus 1300 of the present embodiment extracts the random number initial value and the recording start position that are recorded as the first sub information and are necessary to read the second sub information, and reads the second sub information using the extracted information, and also detects the encryption key information etc. Also, while reading the second sub information, the optical disc playback apparatus 1300 reads the first sub information that is used to read the second sub information recorded in the next block in the readout track direction. As a result, although the plurality of different sets of sub information, namely the first sub information and the second sub information, are recorded on the optical disc, the readout of the first sub information and the readout of the second sub information can be performed simultaneously. This reduces the time taken for reading the plurality of different sets of sub information.

The first sub information is coded using error correction codes and then recorded. When the playback apparatus determines that the first sub information has not been read successfully, the apparatus stops integrating the correlation in the next ECC block, and holds the integral. This prevents unauthorized integration from being performed when the random number initial value and or the recording start position, which are recorded as the first sub information, cannot be read successfully, and prevents the accuracy of the read second sub information from being degraded.

Although the present embodiment describes the method for recording the first sub information by altering the ID information of the synchronization codes that are inserted in units of frames of the main information and recording the second sub information by changing the reflectivity of the reflection film through laser light irradiation, the present invention should not be limited to this structure. The first sub information may be recorded with any other method with which information unique to each stamper can be recorded. For example, the first sub information may be recorded by deforming the recording marks, shifting the positions of the recording marks, or altering the pattern of the recording marks.

1.4.3 Operation of the Optical Disc Playback Apparatus

Figure 14:
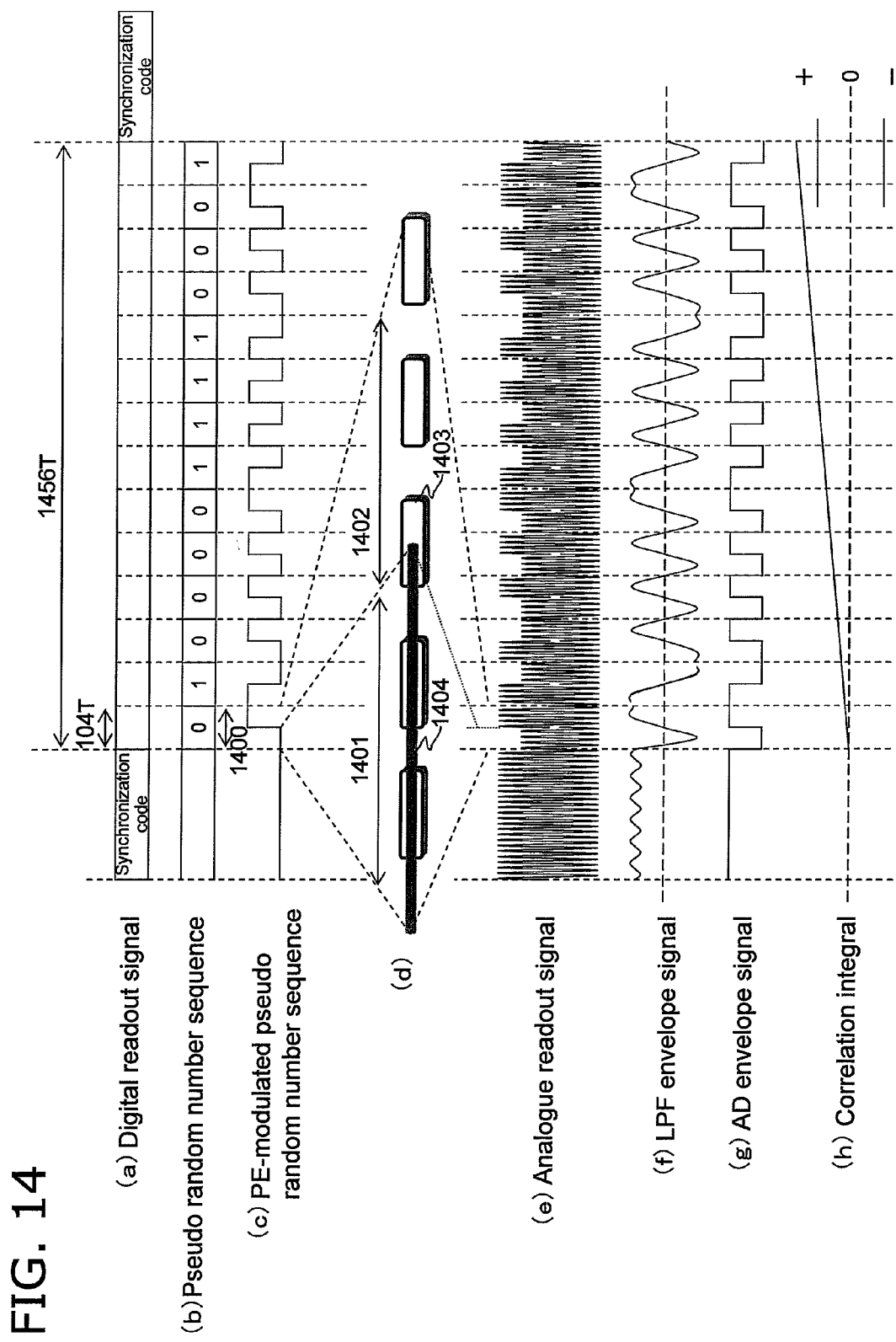
FIGS. 14(*a*) to 14(*h*) are timing charts showing the operation of the optical disc playback apparatus.

FIGS. 14(*a*) to 14(*h*) are timing charts showing the operation of the optical disc playback apparatus of the present embodiment shown in FIG. 13.

FIG. 14(*a*) shows a digital readout signal that is an output signal from the digital signal processing unit 1304 included in the optical disc playback apparatus 1300 of the present embodiment. The digital readout signal is recorded together with synchronization codes, which are inserted in units of frames. For a DVD-ROM, for example, a 32-bit synchronization code is inserted for every $1488^{th}$ channel bit of the readout signal.

FIG. 14(*b*) shows a pseudo random number sequence that is an output signal from the pseudo random number generation unit 1310 included in the optical disc playback apparatus 1300 of the present embodiment. In the present embodiment, a single bit of the pseudo random number sequence is output for every $104^{th}$ channel bit of the frame excluding the synchronization code part of the frame. The pseudo random number sequence output from the pseudo random number generation unit 1310 is a typical M-sequence signal. The pseudo random number sequence is generated using the initial value that is set at the same timing as the random number initializing timing of the pseudo random number generation unit 1009 included in the optical disc manufacturing apparatus 1000 of the present embodiment shown in FIG. 10. The initial value of the pseudo random number sequence is a random number initialization value recorded as the first sub information that is read from an immediately preceding ECC block of the frame on the temporal axis (FIG. 14(*a*)). In the present embodiment, the optical disc is assumed to be a DVD-ROM. For a DVD-ROM, a single bit of the pseudo random number sequence is generated for every $104^{th}$ channel bit in the 1456-channel bit section of the 1488-channel bit frame excluding the 32-channel bit synchronization code. In this case, the resulting 14-bit pseudo random number sequence is output per frame.

FIG. 14(*c*) shows a PE-modulated pseudo random number sequence that is obtained by modulating the pseudo random number sequence (FIG. 14(*b*)) generated by the pseudo random number generation unit 1310 by phase modulation, which is performed by the PE modulation unit 1311 included in the optical disc playback apparatus 1300 of the present embodiment. The PE-modulated pseudo random number sequence is generated by setting, in the 1456-channel bit section of the frame excluding the synchronization code part, the first half 52-channel bit section of the signal to 0 and the latter half 52-channel bit section of the signal to 1 when the input pseudo random number sequence indicates the value of 0, and the first half 52-channel bit section of the signal to 1 and the latter half 52-channel bit section of the signal to 0 when the input pseudo random number sequence indicates the value of 1.

FIG. 14(*d*) shows the physical state of ideal recording marks formed in a section 1400, in which the pseudo random number sequence within the frame shown in FIG. 14(*a*) indicates the value of 0. In a section 1401 of the optical disc of the present embodiment, in which the PE-modulated pseudo random number sequence indicates the value of 0, a reflectivity changing mark 1403 is formed by changing the reflectivity of the reflection film at a position corresponding to the recording mark 1403 through laser light irradiation. In a section 1402 in which the PE-modulated pseudo random number sequence indicates the value of 1, a reflectivity changing mark 1404 is not formed.

FIG. 14(*e*) shows the readout waveform of the optical disc playback apparatus 1300 shown in FIG. 13 when the apparatus 1300 plays the optical disc of the present embodiment, on which the second sub information shown in FIG. 14(*d*) has been recorded by forming the reflectivity changing marks. FIG. 14(*e*) shows an ideal analogue readout signal that is output from the analogue signal processing unit 1303. The output level of the analogue readout signal should ideally decrease in a section in which a reflectivity changing mark is formed (in the section 1401 for example) because the reflectivity decreases in that section. The output level of the analogue readout signal does not decrease in a section in which a reflectivity changing mark is not formed (in the section 1402 for example).

FIG. 14(*f*) shows an LPF envelope signal that is an output signal from the LPF 1312 included in the optical disc playback apparatus 1300 of the present embodiment. The LPF 1312 is formed by a typical filter that passes low-frequency elements. The LPF 1312 thus outputs, as an LPF envelope signal, a signal representing a low-frequency element of the analogue readout signal (FIG. 14(*e*)) and indicating whether a reflectivity changing mark is formed.

FIG. 14(*g*) shows an AD envelope signal that is output from the AD conversion unit 1313 included in the optical disc playback apparatus 1300 of the present embodiment. The AD envelope signal is obtained by digitizing the LPF envelope signal (FIG. 14(*f*)) based on determination using a threshold. The L level of the AD envelope signal indicates a section in which a reflectivity changing mark is formed, whereas the H level of the AD envelope signal indicates a section in which a reflectivity changing mark is not formed.

FIG. 14(*h*) shows a correlation integral generated by the correlation integral unit 1314 included in the optical disc playback apparatus 1300 of the present embodiment. The correlation integral unit 1314 integrates the correlation between the PE-modulated pseudo random number sequence (FIG. 14(*c*)) and the AD envelope signal (FIG. 14(*g*)). When the PE-modulated pseudo random number sequence and the AD envelope signal agree with each other, the correlation integral unit 1314 integrates the correlation between them to the positive side. When the PE-modulated pseudo random number sequence and the AD envelope signal do not agree with each other, the correlation integral unit 1314 integrates the correlation between them to the negative side. In the present embodiment, the PE-modulated pseudo random number sequence (FIG. 14(*c*)) and the AD envelope signal (FIG. 14(*g*)) are in complete agreement with each other. In this state, the correlation integral increases to the positive side. The scrambling-target information detection unit 1315 extracts the scrambling-target information bit for every third frame, which is the unit for recording a single bit of the second sub information. The scrambling-target information detection unit 1315 also detects the scrambling-target information bit by comparing the correlation integral signal with a positive-side threshold and with a negative-side threshold. When the correlation integral value exceeds the positive-side threshold, the scrambling-target information detection unit 1315 detects the bit value of 1 as the scrambling-target information bit. When the correlation integral value is less than the negative-side threshold, the scrambling-target information detection unit 1315 detects the bit value of 0 as the scrambling-target information bit. In the present embodiment, as shown in FIG. 12(*c*), the bit value of 1 is recorded as the bit information (scrambling-target information) that is yet to be scrambled into the second sub information. In this case, the scrambling-target information detection unit 1315 integrates the correlation integral shown in FIG. 14(*h*) to the positive side, and detects the bit value of 1 as the second sub information.

1.5 Advantageous Effects of the First Embodiment

As described above, the optical disc of the first embodiment and the manufacturing apparatus and the playback apparatus for the optical disc prevent the content stored in the optical disc from being decrypted and therefore prevent the content from being copied when only the first sub information unique to the optical disc master is obtained successfully but unless the second sub information unique to the optical disc is obtained. In the same manner, the content cannot be decrypted and therefore cannot be copied when only the second sub information is obtained successfully but unless the first sub information is obtained.

The optical disc of the present embodiment and the manufacturing apparatus and the playback apparatus for the optical disc prevent the content stored in the optical disc from being read when the correlation, or in other words the association between the first sub information and the second sub information cannot be identified, and therefore improve the resistance to unauthorized copying of the content.

The optical disc of the present embodiment and the manufacturing apparatus and the playback apparatus for the optical disc also reduce the overhead for reading sub information by recording a plurality of different sets of sub information into the same area from which the plurality of sets of sub information can be read simultaneously.

The plurality of sets of sub information are recorded in a manner that the plurality of sets of sub information are associated with one another. This eliminates unauthorized playback apparatuses that would bypass readout of one of the sets of sub information and decrypt the content. As a result, the optical disc of the present embodiment and the manufacturing apparatus and the playback apparatus for the optical disc enable digital content to be distributed in a reliable manner using an optical disc.

2. Second Embodiment

A second embodiment of the present invention will now be described with reference to the drawings.

2.1 Second Embodiment Overview

The second embodiment differs from the first embodiment in the following points.

In the first embodiment, information necessary to read the second sub information (the initial value used to generate random numbers and the recording start position of the second sub information) is recorded as the first sub information unique to the stamper. In this case, the encryption key cannot be obtained from the second sub information unless the first sub information is detected.

In the present embodiment, information necessary to obtain the encryption key from the first sub information is recorded as the second sub information. Unlike in the first embodiment, the structure of the present embodiment enables the encryption key to be obtained from the first sub information only when the second sub information is detected successfully.

In the present embodiment, the first sub information is recorded onto the optical disc master (or the stamper) in the same manner as in the first embodiment by altering the pattern of synchronization codes that are inserted in units of frames, shifting the edges of the concave or convex recording marks (shifting in the radial direction for example), or shifting the entire recording marks (shifting in the radial direction for example). The second sub information is recorded using marks that are additionally formed on the completed optical disc by changing the reflectivity of the reflective film at positions corresponding to the concave or convex recording marks through laser light irradiation.

Figure 15:
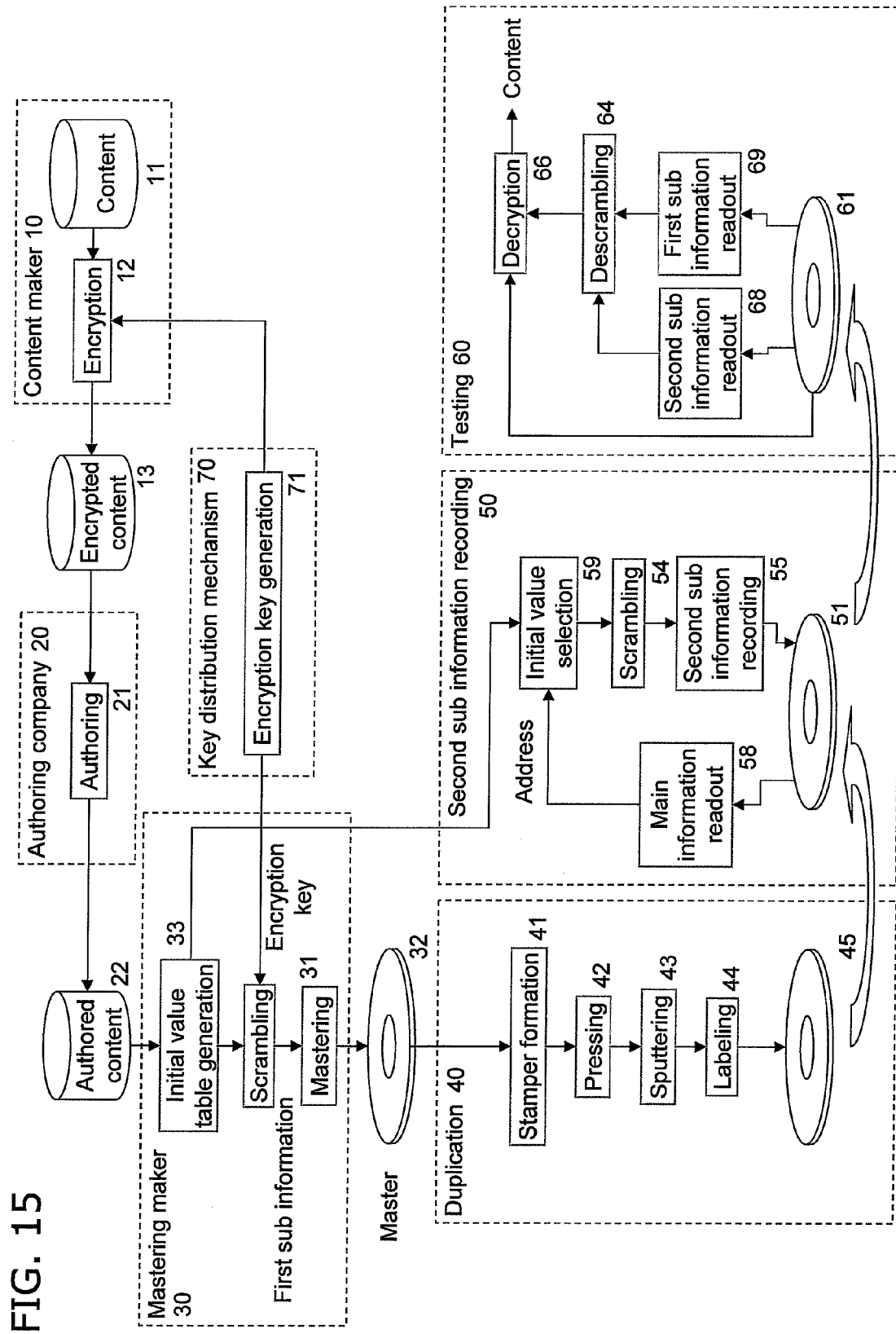
FIG. 15 is a flowchart showing processes for manufacturing an optical disc according to a second embodiment of the present invention.

FIG. 15 is a flowchart showing processes for manufacturing an optical disc according to the present embodiment. The optical disc manufacturing processes of the present embodiment differ from the processes of the first embodiment in additionally including initial value table generation 33, which is performed by the mastering maker 30, main information readout 58 and initial value selection 59 included in the second sub information recording 50, and second sub information readout 68 and first sub information readout 69 included in the testing 60. The other processes of the present embodiment are basically the same as the processes described in the first embodiment and are given the same reference numerals as those processes, and will not be described in the present embodiment.

In the initial value table generation 33, an initial value table (FIG. 16), which is used when the first sub information is recorded onto the optical disc master, is generated. The initial value table stores initial value information (information associated with the first sub information) in units of ECC blocks, for the pseudo random number sequence that is used to scramble the encryption key and generate the first sub information.

The first sub information in the present embodiment is recorded with the same method as the method for recording the sub information shown in FIG. 3B. The encryption key is scrambled in the same manner as in the scrambling performed by the scrambling unit 1011 included in the optical disc recording apparatus of the first embodiment, and is recorded as the first sub information. The first sub information in the present embodiment differs from the first sub information in the first embodiment in that the encryption key is scrambled (for example by calculating an exclusively OR) using a pseudo random number sequence generated in advance, and is then recorded.

The initial value table is generated by first generating an initial value randomly for each ECC block included in an area in which the first sub information is to be recorded, and associating each generated initial value with a block position (for example, address information). After the initial value table is generated, the mastering 31 is performed, in which initial value information associated with address information is read from the initial value table and a pseudo random number sequence is generated using the read initial value. The encryption key is then scrambled using the generated pseudo random number sequence. The first sub information is recorded by using either an altered or unaltered synchronization code depending on the bit value of the information generated by scrambling the encryption key.

The generated initial value table is transferred to the next process, or to the second sub information recording.

The first sub information in the present embodiment is generated by scrambling the encryption key for the content, which has been generated through the encryption key generation 71. The content encryption key is scrambled using the pseudo random number sequence generated using the initial value that has been set in the initial value table. The scrambled encryption key is then recorded as the first sub information.

To enable the content to be read, the first sub information needs to be read successfully. To enable the first sub information to be read successfully, the random number initial value information, which has been set in the initial value table and used to generate the pseudo random number sequence, needs to be obtained.

In the main information readout 58 included in the second sub information recording 50, the main information recorded on an optical disc 51, on which the first sub information generated in the duplication 40 has been recorded, is read. The address information for each block is read by reading the main information. The read address information is then output to the initial value selection 59.

In the initial value selection 59, the initial value table generated in the initial value table generation 33 performed by the mastering maker 30 as well as the address for each block obtained in the main information readout 58 are received, and an initial value is selected from the initial value table. In the initial value selection 59, an initial value that differs depending on each block is selected from the initial value table, and the selected initial value is sent to the scrambling 54.

In the scrambling 54, the initial value selected in the initial value selection 59 is scrambled to generate the second sub information. The second sub information is then recorded onto the optical disc 51 in the second sub information recording 55.

The testing 60 includes the second sub information readout 68, in which the second sub information is read from an optical disc 61 on which the first sub information and the second sub information have been recorded. The initial value to be used to read the first sub information is extracted from the second sub information. The first sub information read in the first sub information readout 69 using the extracted initial value is then descrambled in the descrambling 64 to obtain the encryption key for the content. The encrypted content is then read for testing using the obtained encryption key.

As described above in the present embodiment, the first sub information is recorded by scrambling the encryption key for the content using the initial value of the pseudo random number sequence assigned to each ECC block, and the second sub information is recorded by scrambling the initial value of the pseudo random number sequence. In the same manner as in the first embodiment, this enables the manufacture of an optical disc from which the content information is prohibited from being read unless both the first sub information and the second sub information are read.

2.2 Recording First Sub Information and Second Sub Information

Figure 16:
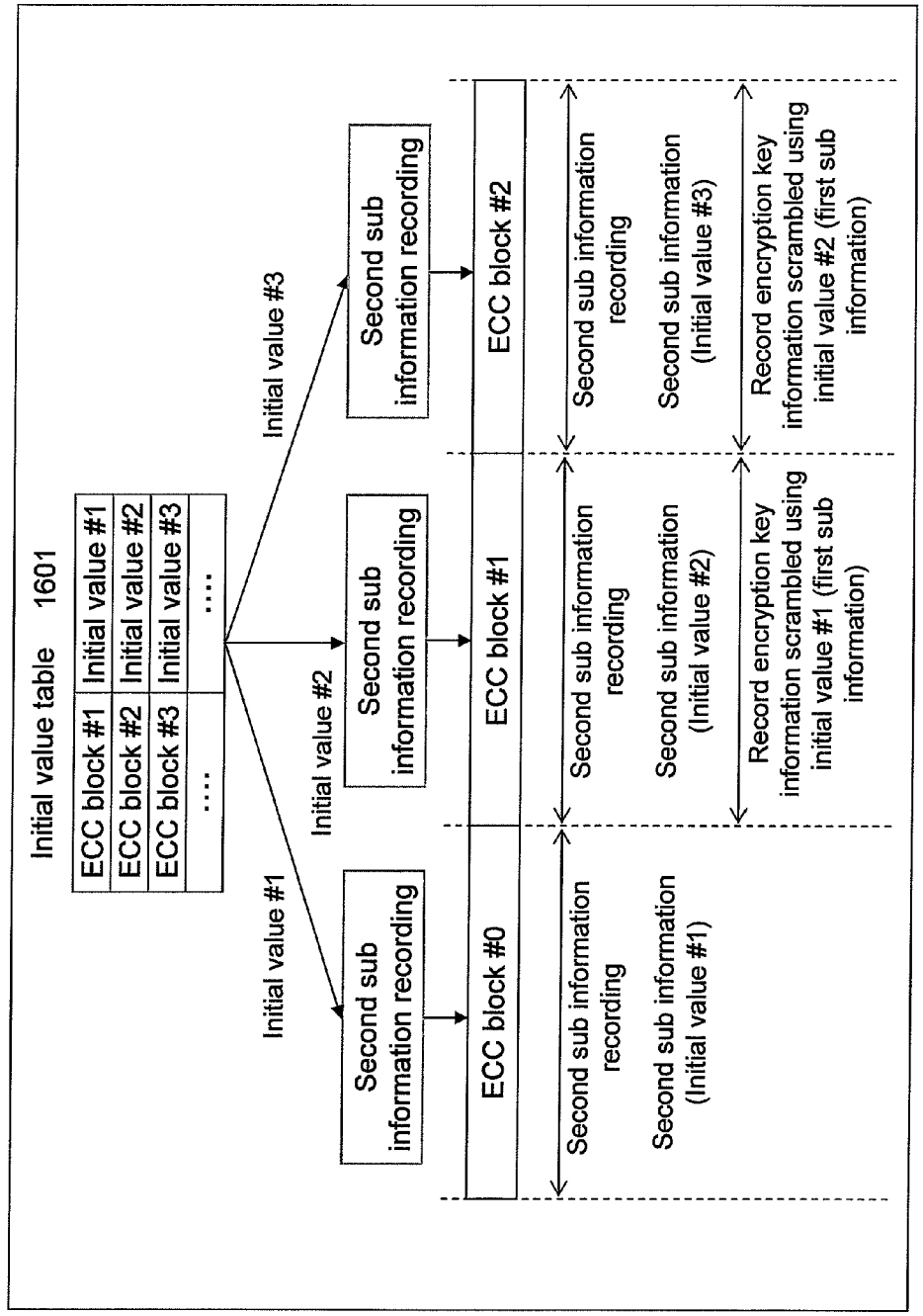
FIG. 16 is a conceptual diagram showing the recording pattern of first sub information and second sub information in the second embodiment.

FIG. 16 is a conceptual diagram showing a method for recording the first sub information and the second sub information of the present embodiment. FIG. 16 is a conceptual diagram showing the initial value table 1601, which is generated in the initial value table generation 33 performed by the mastering maker 30 of the optical disc. The initial value table 1601 is generated before the optical disc master is generated (before mastering). The initial value table 1601 stores the address information for each ECC block into which the first sub information is to be recorded and the initial value information used to generate a pseudo random number sequence. The initial value table 1601 associates the address information and the initial value information. The initial value table 1601 may include information unique to each optical disc master.

In the example shown in FIG. 16, the first sub information is recorded in the ECC blocks #1 and #2 and subsequent blocks. The ECC blocks #0, #1, and #2 and subsequent blocks are arranged continuous to one another along the spiral track in the circumferential direction of the optical disc in which information is to be read from the optical disc. The ECC block #0 is arranged at an inner circumferential side from the ECC block #1. The ECC block #1 and the ECC block #2 also have the same positional relationship between them.

With the method for recording the second sub information according to the present embodiment, the initial value is first read based on the initial value table 1601 and the address information that has been read as the main information. More specifically, the initial value #1 associated with the ECC block #1 in the initial value table 1601 is read when the recording position of the first sub information reaches the ECC block #0, which immediately precedes the ECC block #1, from which the recording of the first sub information has been started. The read initial value is then recorded as the second sub information into the ECC block #0. In the same manner, the initial value #2 associated with the ECC block #2 is read from the initial value table 1601 when the recording position reaches the ECC block #1, and the read initial value is recorded as the second sub information into the ECC block #1.

As a result, the second sub information is recorded into in the ECC blocks #1 and #2 in which the first sub information has been recorded. In each of the ECC blocks #1 and #2, the first sub information and the second sub information are recorded in the same area. In the ECC block #1, the first sub information scrambled using the initial value #1 by the mastering maker 30 has been recorded. In addition to this, the initial value #2 corresponding to the first sub information of the ECC block #2 has also been recorded in the ECC block #1.

2.3 Reading First Sub Information and Second Sub Information

Figure 17:
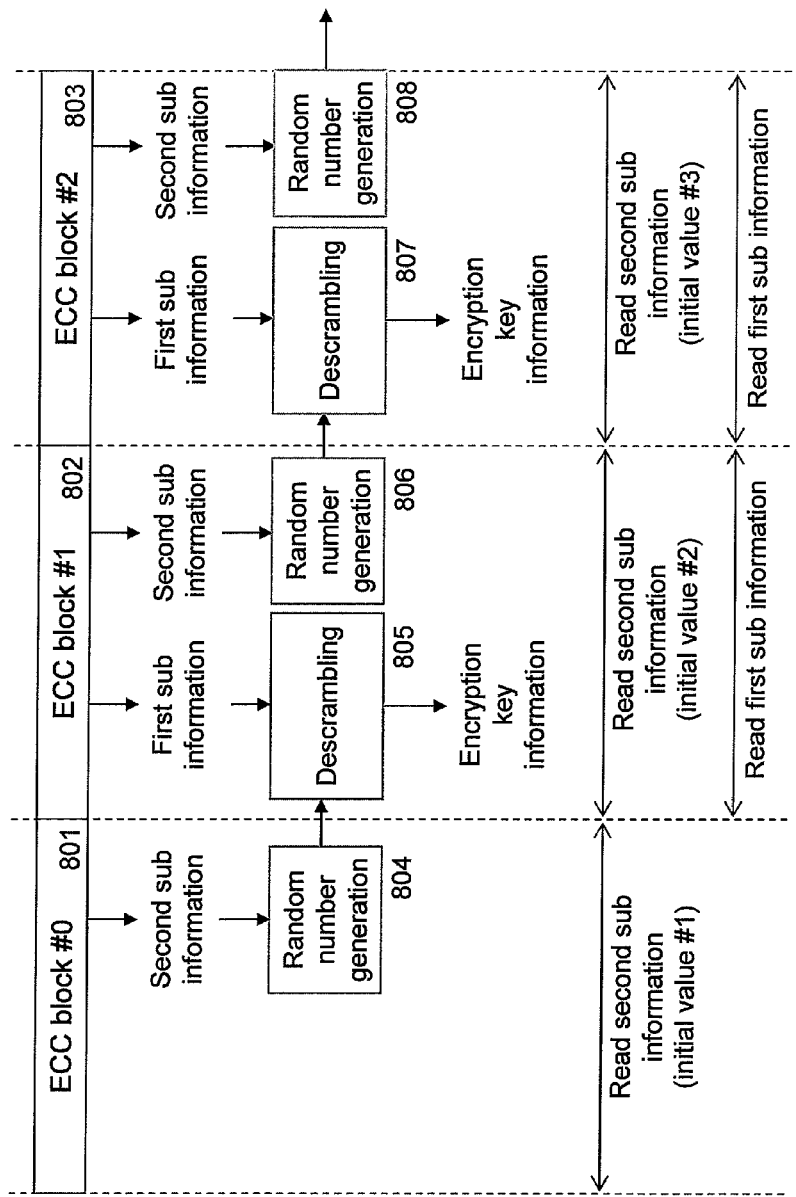
FIG. 17 is a flowchart showing a method for reading the first sub information and the second sub information in the second embodiment.

FIG. 17 is a conceptual diagram showing the method for reading the first sub information and the second sub information according to the present embodiment. First, the initial value #1 is read from the ECC block #0 as the second sub information. The first sub information that has been recorded in the ECC block #1 is descrambled using the pseudo random number sequence generated using the initial value #1, which has been extracted as the second sub information from the ECC block #0. From the ECC block #1, the initial value #2 is read as the second sub information. The first sub information that has been recorded in the ECC block #2 is descrambled using the pseudo random number sequence generated using the initial value #2, which has been extracted as the second sub information from the ECC block #1. In this manner, the first sub information is descrambled to obtain the encryption key for the content.

2.4 Optical Disc Manufacturing Apparatus

Figure 18:
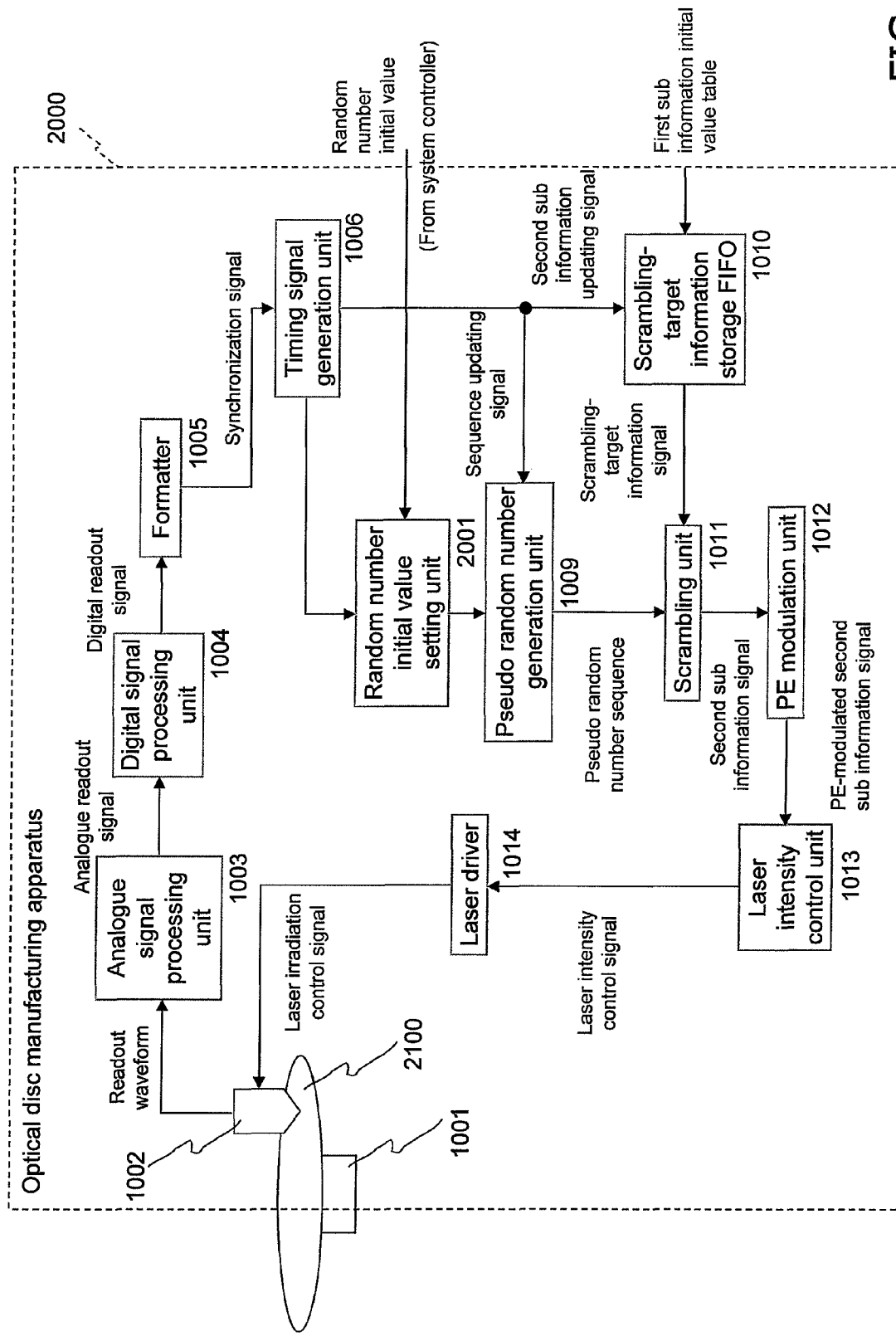
FIG. 18 is a block diagram showing the structure of an optical disc manufacturing apparatus according to the second embodiment.

FIG. 18 shows the structure of an apparatus for recording the second sub information on the optical disc 2100 according to the second embodiment of the present invention, or namely an optical disc manufacturing apparatus 2000. The optical disc manufacturing apparatus 2000 has substantially the same structure as the optical disc manufacturing apparatus 1000 shown in FIG. 10 except that the apparatus 2000 includes a random number initial value setting unit 2001, and does not include the first sub information detection unit 1007 and the first sub information error correction unit 1008. The components of the optical disc manufacturing apparatus 2000 that are the same as the components of the optical disc manufacturing apparatus 1000 of the first embodiment are given the same reference numerals as those components. The operation of the optical disc manufacturing apparatus 2000 will be described focusing only on its differences from the operation of the optical disc manufacturing apparatus 1000 of the first embodiment.

The timing signal generation unit 1006 obtains a synchronization signal from the formatter 1005, and then outputs a sequence updating signal at every predetermined timing to the pseudo random number generation unit 1009. The timing signal generation unit 1006 further outputs, to the scrambling-target information storage FIFO 1010, a second sub information updating signal indicating the bit transmission timing of the second sub information that is to be recorded at every predetermined timing.

The random number initial value setting unit 2001 obtains a predetermined random number initial value from a system controller (not shown). The pseudo random number generation unit 1009 generates a pseudo random number sequence based on the random number initial value obtained from the random number initial value setting unit 2001. The scrambling-target storage FIFO 1010 stores the initial value for each ECC block stored in the initial value table as the scrambling-target information.

The scrambling unit 1011 scrambles the initial value obtained from the initial value table, which is stored in the scrambling-target information storage FIFO 1010, using the pseudo random number sequence generated by the pseudo random number generation unit 1009 to generate a second sub information signal.

In the same manner as in the first embodiment, the PE modulation unit 1012 modulates the second sub information signal by phase encoding. The laser intensity control unit 1013 controls the laser driver 1014 in accordance with the modulated second sub information signal, and irradiates the optical disc with laser light. Through the laser light irradiation, the second sub information signal is recorded onto an optical disc 2100.

2.5 Optical Disc Playback Apparatus

Figure 19:
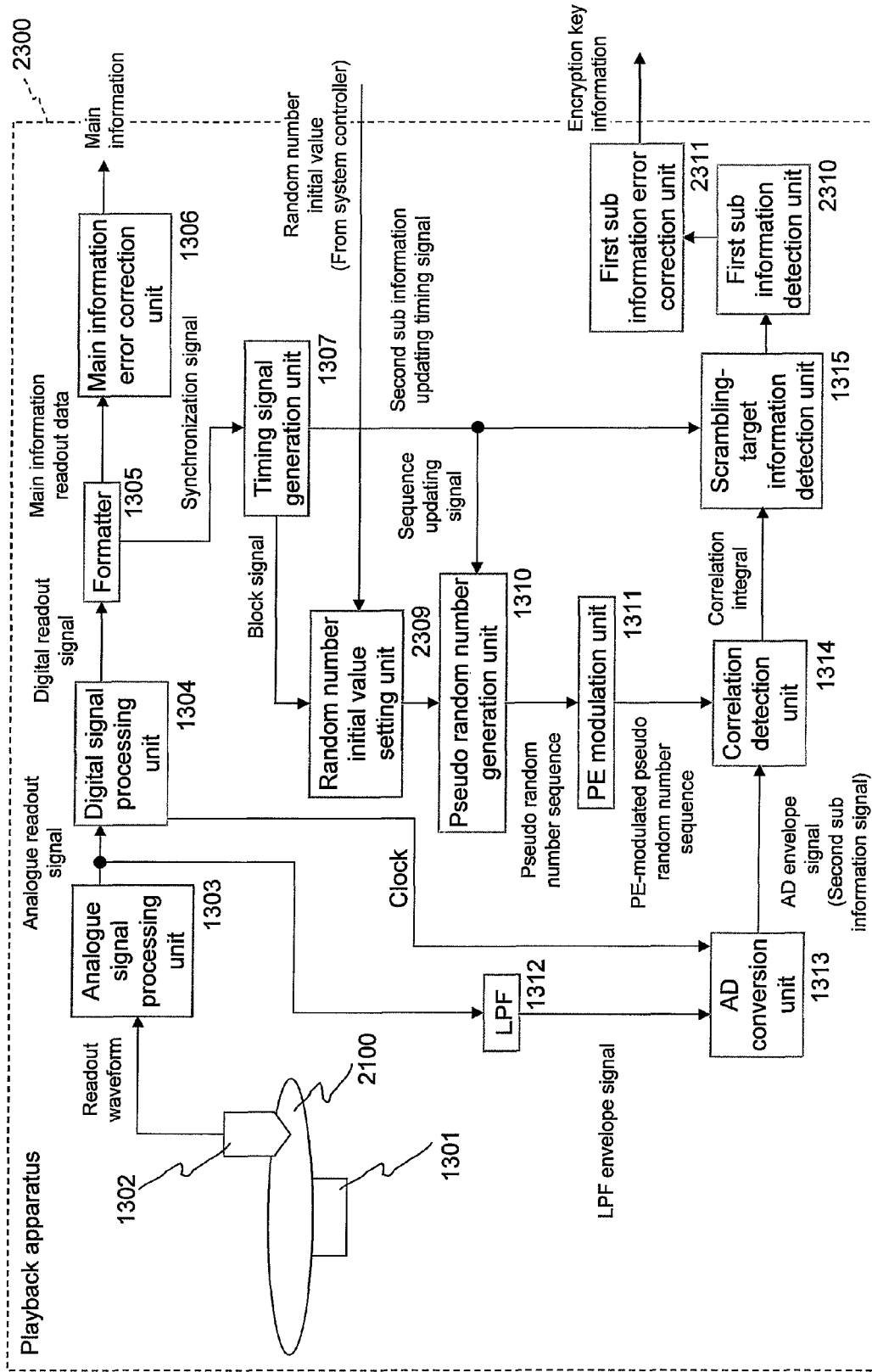
FIG. 19 is a block diagram showing the structure of an optical disc playback apparatus according to the second embodiment.

FIG. 19 shows the structure of an optical disc playback apparatus 2300 for playing the optical disc 2100 of the present embodiment on which the first sub information and the second sub information have been recorded. The optical disc playback apparatus 2300 has substantially the same structure as the optical disc playback apparatus 1300 of the first embodiment except that a scrambling-target information detection unit 1315 detects the initial value as the scrambling-target information, and a first sub information detection unit 2310 reads the first sub information using the initial value and obtains the encryption key information. The components of the optical disc playback apparatus 2300 that are the same as the components of the optical disc playback apparatus 1300 of the first embodiment are given the same reference numerals as those components. The operation of the optical disc playback apparatus 2300 will be described focusing only on its differences from the operation of the optical disc playback apparatus 1300 of the first embodiment. The LPF 1312 and the AD conversion unit 1313 form a second sub information reading unit that reads the second sub information. The pseudo random number generation unit 1310, the PE modulation unit 1311, the correlation detection unit 1314, and the scrambling-target information detection unit 1315 form a testing unit that detects information associated with the first sub information (scrambling-target information, that is, the random number initial value stored in the initial value table) from the second sub information.

The timing signal generation unit 1307 generates a block signal indicating the timing corresponding to an ECC block from which the second sub information is to be read based on a synchronization signal provided from the formatter 1305, and outputs the generated block signal to the random number initial value setting unit 2309. The timing signal generation unit 1307 generates a sequence updating signal indicating the timing when the pseudo random number sequence generated by the pseudo random number generation unit 1310 is to be updated, in accordance with the input synchronization signal, and outputs the generated sequence updating signal to the pseudo random number generation unit 1310. The timing signal generation unit 1307 also outputs a second sub information updating timing signal to the scrambling-target information detection unit 1315 in accordance with the input synchronization signal.

The random number initial value setting unit 2309 obtains a predetermined random number initial value from a system controller (not shown). The predetermined random number initial value is the same as the random number initial value input into the random number initial value setting unit 2001 included in the optical disc manufacturing apparatus 2000 (FIG. 18).

The pseudo random number generation unit 1310 generates a pseudo random number sequence using the random number initial value obtained from the random number initial value setting unit 2309. In the same manner as in the optical disc playback apparatus 1300 of the first embodiment, the PE modulation unit 1311 modulates the pseudo random number sequence input from the pseudo random number generation unit 1310 by phase encoding. In the same manner as in the first embodiment, the correlation detection unit 1314 detects the correlation between an AD envelope signal output from the AD conversion unit 1310 and a PE-modulated pseudo random number sequence output from the PE modulation unit 1311 through integration.

In the same manner as in the first embodiment, the scrambling-target information detection unit 1315 detects the scrambling-target information bit from the correlation integral signal output from the correlation detection unit 1314 in accordance with the second sub information updating timing signal output from the timing generator 1307. More specifically, the scrambling-target information corresponds to the initial value for each ECC block included in the initial value table.

The first sub information detection unit 2310 first modulates, by phase encoding, the pseudo random number sequence, which has been generated by the pseudo random number generation unit (not shown) using the initial value detected by the scrambling-target information detection unit 1315 and set to be used by the pseudo random number generation unit, to generate a PE-modulated pseudo random number sequence. The first sub information detection unit 2310 then detects the correlation between the PE-modulated pseudo random number sequence and the first sub information signal read from the optical disc through integration. As a result, the first sub information detection unit 2310 outputs the encryption key information.

A first sub information error correction unit 2311 receives the encryption key information coded using error correction codes from the first sub information detection unit 2310, and subjects the encryption key information to error correction.

2.6 Advantageous Effects of the Second Embodiment

As described above in the second embodiment, the random number initial value necessary to read the first sub information is recorded as the second sub information. In the same manner as the advantageous effects of the first embodiment, the structure of the second embodiment prohibits the content information from being read unless both the first sub information and the second sub information are read successfully, and improves the level of copyright protection for the content information.

The two different sets of sub information, namely the first sub information and the second sub information, are recorded to improve the copyright protection level. The first sub information is recorded during the mastering, whereas the second sub information is recorded after the disc is completed. This enables the first sub information and the second sub information to be recorded in the same area in units of ECC blocks of the optical disc. The first sub information and the second sub information recorded in the same area can be read simultaneously in units of ECC blocks when the optical disc is played. This shortens the time taken for accessing the information as compared with the structure in which the first sub information and the sub information are read separately.

3. Other Embodiments 3.1

On the optical disc according to the first and second embodiments, the first sub information, which is unique to the stamper on which the main information has been recorded, and the second sub information, which is unique to each disc, are recorded. Although the above embodiments describe the case in which the first sub information is recorded by altering the ID codes of the synchronization codes of the main information and the second sub information is recorded by using reflectivity changing marks that are formed by changing the reflectivity of the reflective film at positions corresponding to the recording marks through laser light irradiation, the present invention should not be limited to this structure.

The first sub information of the above embodiments may be recorded with any method with which the first sub information unique to the stamper can be recorded. For example, the first sub information may be recorded by deforming the recording marks, changing the positions of the recording marks, or changing the pattern of the recording marks.

Figure 20:
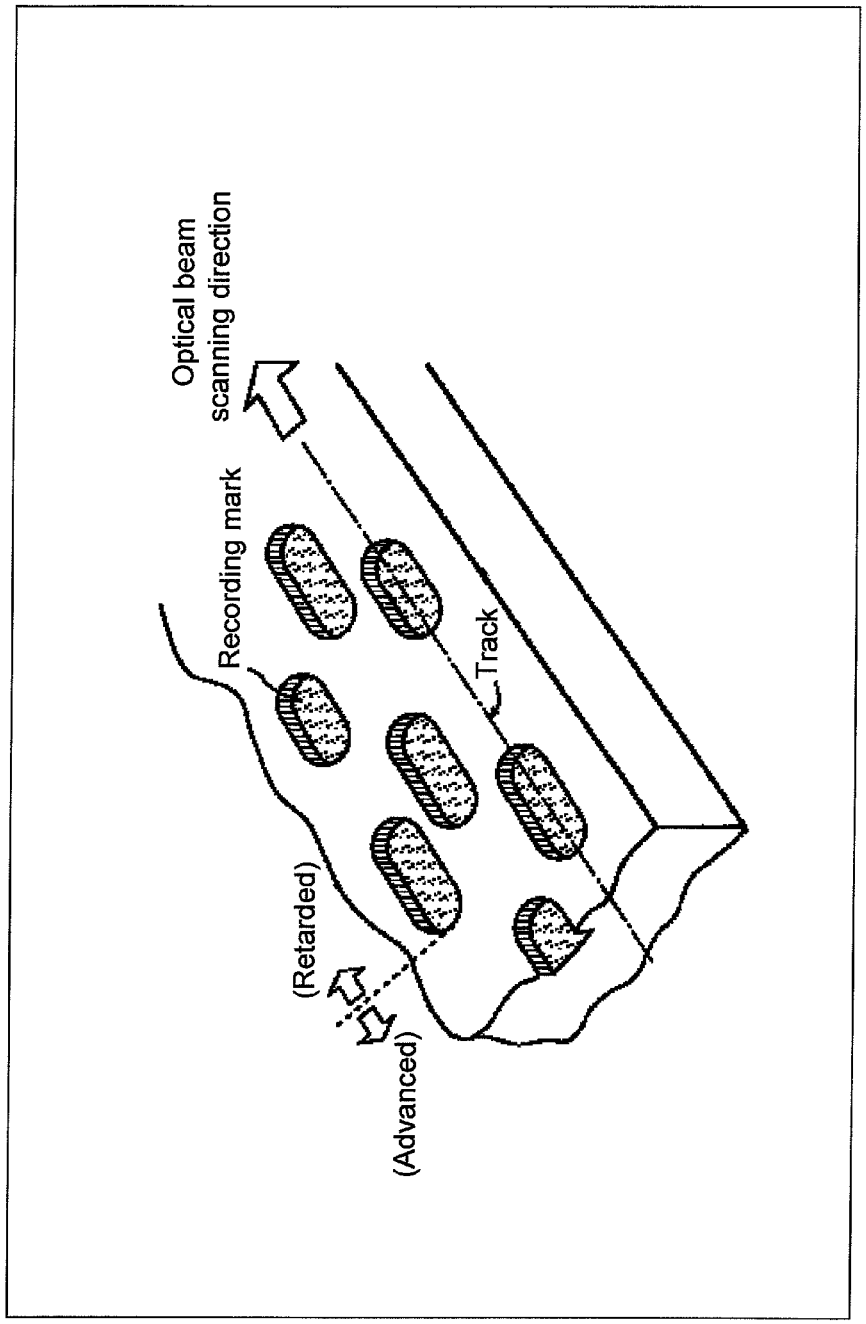
FIG. 20 shows the surface details of an optical disc according to another embodiment of the present invention on which first sub information has been recorded.
Figure 21:
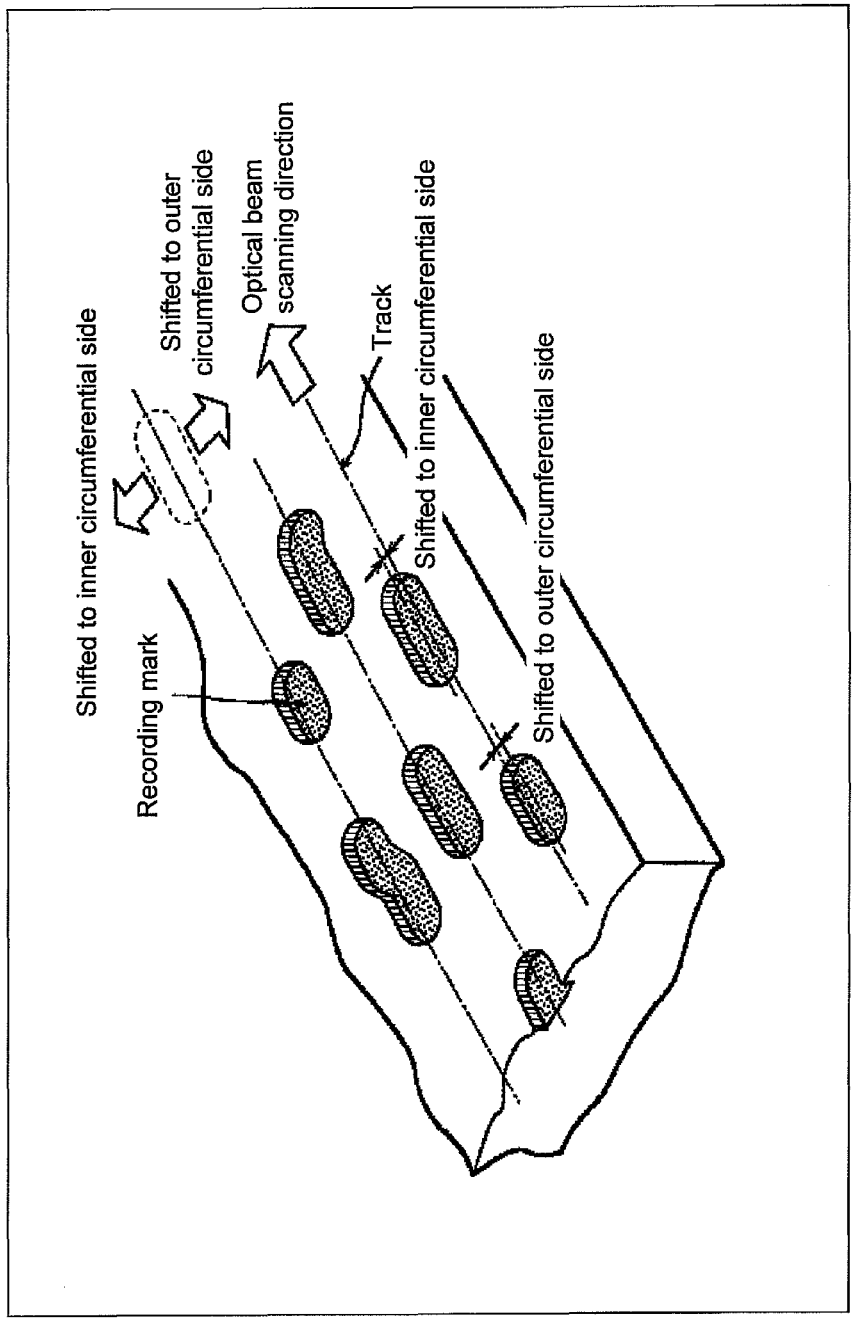
FIG. 21 shows the surface details of an optical disc according to another embodiment of the present invention on which first sub information has been recorded.

FIGS. 20 and 21 each show an example of the first sub information that is recorded by deforming the recording marks or by changing the positions of the recording marks.

FIG. 20 shows an example of the first sub information that is recorded by shifting the recording marks in the track direction of the optical disc. During recording of the main information, the first sub information is recorded by shifting the edges on two ends of each recording mark (edges that determine the length of each recording mark in the track direction). With this method, the first sub information is recorded as being embedded in the main information. To record the first sub information, for example, a predetermined pseudo random number sequence may be generated using an initial value for a prestored pseudo random number sequence and key information, and a modulation signal may be obtained by modulating a channel signal for recording the main information in a manner to be advanced or retarded by a predetermined short time in accordance with the predetermined pseudo random number sequence. The recording marks are then formed in accordance with the modulation signal. The recording marks formed in this manner have their edges shifted in the track direction by a predetermined small amount. In this case, when the edges on both the two ends of each recording mark are advanced or retarded, the position of the recording mark is shifted in the track direction (in the scanning direction of optical beams). When the edge on one of the two ends of each recoding mark is advanced and the edge on the other one of the two ends of each recording mark is retarded, or when the edge on one of the two ends of each recording mark is retarded and the edge on the other one of the two ends of each recording mark is advanced, the recording mark is deformed to have a longer or shorter length in the track direction.

FIG. 21 shows an example of the first sub information that is recorded by shifting the recording marks in the radial direction of the optical disc. During recording of the main information, the first sub information is recorded by shifting the edges of the recording marks in the width direction (two edges that determine the width of each recording mark). With this method, the first sub information is recorded as being embedded in the main information. To record the first sub information, for example, a predetermined pseudo random number sequence may be generated using an initial value for a prestored pseudo random number sequence and key information, and recording marks are formed by shifting the recording head to an inner circumferential side or to an outer circumferential side by a predetermined small amount in accordance with the predetermined pseudo random number sequence. The recording marks formed in this manner are shifted to the inner circumferential side or the outer circumferential side with respect to the center of the track of the optical disc by a predetermined small amount. In this case, when the edges of a recording mark in the width direction are shifted to the inner circumferential side or the outer circumferential side, the recording mark is shifted to the inner circumferential side or the outer circumferential side of the optical disc. When the edges of a recoding mark in the width direction are first shifted to the inner circumferential side and then shifted to the outer circumferential side, the recording mark is deformed in the radius direction as shown in FIG. 21.

Alternatively, the methods for recording sub information or sub data described in Japanese Unexamined Patent Publication No. H11-126426, Japanese Unexamined Patent Publication No. 2001-357533, Japanese Unexamined Patent Publication No. 2002-203369, International Publication No. 2004 or 036560, Japanese Unexamined Patent Publication No. 2005-216380, and Japanese Unexamined Patent Publication No. 2000-195049 may be used. Also, the method for recording sub information or sub data on the completed optical disc as the second sub information unique to the disc described in Japanese Unexamined Patent Publication No. H11-191218 and International Publication No. 2007 or 139077 may be used.

3.2

Although the first embodiment describes the case in which the random number initial value for the pseudo random number sequence and the recording start position of the second sub information that are used to record or read the second sub information are recorded as the first sub information, the present invention should not be limited to this structure. The first embodiment may be modified freely without departing from the gist of the present invention that the first sub information is required to be read in advance to enable the second sub information to be read. For example, only one of the random number initial value for the pseudo random number sequence and the recording start position may be recorded. Alternatively, the second sub information may be encrypted before recorded, and the first sub information may be a decryption key corresponding to the encryption performed for the second sub information.

The pseudo random number sequence should not be limited to an M sequence, but may be a sequence based on another algorithm known in the art.

3.3

Although the above embodiments describe the case in which the first sub information and the second sub information are recorded in units of ECC blocks, which are the units for recording the main information, the present invention should not be limited to this structure. The first sub information and the second sub information may be recorded in other units for recording the main information, such as in units of frames in which synchronization codes are inserted or in units of sectors having address information, or in a manner that a plurality of such recording units are used as a single unit for recording the information. Recording the first sub information and the second sub information in the recording units used for the main information is within the scope of the present invention.

INDUSTRIAL APPLICABILITY

The present invention is applicable to a master disc or a stamper disc used to manufacture a recording medium, such as a CD, a DVD, a Blu-ray disc, and a ROM disc, an apparatus (recorder) for manufacturing such a recording medium, an apparatus (player) for playing such a recording medium, and a cutting machine used for a master for a ROM disc.

The invention claimed is:

1. An optical disc having main information recorded thereon, the optical disc comprising:
   a spiral track;
   concave or convex recording marks on the spiral track; and
   a reflective film formed on the concave or convex recording marks,
   wherein the main information is for being decrypted using predetermined information,
   wherein the main information is recorded onto the optical disc by arranging the concave or convex recording marks on the spiral track and forming the reflective film on the concave or convex recording marks,
   wherein the main information is recorded onto the optical disc in a plurality of predetermined units, each predetermined unit of the plurality of predetermined units including at least address information and being continuously arranged with respect to another predetermined unit of the plurality of predetermined units in a direction of the spiral track,
   wherein the predetermined information is recorded based on first sub information and second sub information,
   wherein the first sub information is provided for each predetermined unit of the plurality of predetermined units, the first sub information varying for each predetermined unit of the plurality of predetermined units,
   wherein the first sub information is recorded by being superimposed on the main information by shifting the concave or convex recording marks, deforming the concave or convex recording marks, or altering a pattern of the concave or convex recording marks,
   wherein the second sub information is generated by scrambling the predetermined information using the first sub information that varies for each predetermined unit of the plurality of predetermined units,
   wherein the second sub information is recorded by being superimposed on the main information by changing a reflectivity of the reflective film formed on the concave or convex recording marks, and
   wherein, when the second sub information is generated by scrambling the predetermined information using the first sub information recorded in a first predetermined unit of the plurality of predetermined units, the generated second sub information is recorded in a second predetermined unit, of the plurality of predetermined units, that is continuous to and follows the first predetermined unit in the direction of the spiral track.

2. The optical disc according to claim 1,
   wherein the first sub information includes information indicating an initial value that is used to generate a pseudo random number sequence, and
   wherein the second sub information is information generated by scrambling the predetermined information using the pseudo random number sequence that is generated using the initial value.

3. The optical disc according to claim 1, wherein the first sub information is recorded and coded so as to enable a reading error of the first sub information to be detected.

4. The optical disc according to claim 1, wherein the first sub information includes information unique to a master for the optical disc.

5. The optical disc according to claim 1, wherein the second sub information is recorded after the optical disc is molded.

6. The optical disc according to claim 1, wherein the second sub information includes information unique to the optical disc.

7. An optical disc playback apparatus for playing an optical disc,
wherein the optical disc has main information recorded thereon,
wherein the main information is for being decrypted using predetermined information recorded based on first sub information and second sub information,
wherein the main information is recorded onto the optical disc in a plurality of predetermined units, each predetermined unit of the plurality of predetermined units including at least address information and being recorded by arranging concave or convex recording marks on a spiral track of the optical disc,
wherein the first sub information is recorded by shifting the concave or convex recording marks, deforming the concave or convex recording marks, or altering a pattern of the concave or convex recording marks,
wherein the optical disc playback apparatus comprises:
a main information reading unit configured to irradiate the concave or convex recording marks with laser light and to read the main information based on a reflected light element corresponding to the concave or convex recording marks included in reflected light of the laser light;
a first sub information detection unit configured to detect the first sub information recorded on to the optical disc to correspond to each predetermined unit of the plurality of predetermined units of the main information, the first sub information varying for each predetermined unit of the plurality of predetermined units;
a first sub information storing unit configured to store the first sub information detected for each predetermined unit of the plurality of predetermined units;
a second sub information reading unit configured to read, for each predetermined unit of the plurality of predetermined units, the second sub information, the second sub information being generated by scrambling the predetermined information using the first sub information, in accordance with a change in a reflection intensity that differs from a reflection intensity of the reflected light element corresponding to the concave or convex recording marks included in the reflected light; and
a testing unit configured to descramble the second sub information generated by the scrambling using the first sub information stored in the first sub information storing unit,
wherein the first sub information detection unit detects the first sub information that varies for each predetermined unit of the plurality of predetermined units, and
wherein the testing unit uses the first sub information detected in a first predetermined unit of the plurality of predetermined units to descramble the second sub information recorded in a second predetermined unit, of the plurality of predetermine units, that is continuous to and follows the first predetermined unit in the direction of the spiral track.

8. The optical disc playback apparatus according to claim 7, wherein the testing unit performs the descrambling by calculating a correlation between a pseudo random number sequence generated using an initial value indicated by the first sub information and the change in the reflection intensity.

9. The optical disc playback apparatus according to claim 7,
wherein the first sub information is recorded and coded so as to enable a reading error of the first sub information to be detected,
wherein the optical disc playback apparatus further includes a first sub information error detection unit, and
wherein the first sub information error detection unit determines whether an error has occurred in reading the first sub information detected by the first sub information detection unit, and suspends an operation for detecting a correlation, which is calculated by the testing unit between a pseudo random number sequence generated using an initial value indicated by the first sub information and the change in the reflection intensity, when determining that the error has occurred.

10. An optical disc playback apparatus for playing an optical disc,
wherein the optical disc has main information recorded thereon,
wherein the main information is for being decrypted using predetermined information recorded based on first sub information and second sub information,
wherein the main information is recorded onto the optical disc in a plurality of predetermined units, each predetermined unit of the plurality of predetermined units including at least address information and being recorded by arranging concave or convex recording marks on a spiral track of the optical disc,
wherein the first sub information is recorded by shifting the concave or convex recording marks, deforming the concave or convex recording marks, or altering a pattern of the concave or convex recording marks, and
wherein the optical disc playback apparatus comprises:
a main information reading unit configured to irradiate the concave or convex recording marks with laser light and to read the main information based on a reflected light element corresponding to the concave or convex recording marks included in reflected light of the laser light;
a second sub information reading unit configured to read the second sub information based on a change in a reflection intensity that differs from a reflection intensity of the reflected light element corresponding to the concave or convex recording marks included in the reflected light;
a testing unit configured to detect information associated with the first sub information from the second sub information; and
a first sub information detection unit configured to read the first sub information, detect a correlation between the read first sub information and the information associated with the first sub information, and output the predetermined information that is to decrypt the main information based on a result of the detection performed by the first sub information detection unit.

11. The optical disc playback apparatus according to claim 10, wherein the second sub information reading unit reads the second sub information recorded for a first predetermined unit of the plurality of predetermined units, and subsequently first sub information detection unit reads the first sub information recorded for a second predetermined unit, of the plurality of predetermined units, that is continuous to and follows the first predetermined unit in the direction of the spiral track.

12. The optical disc playback apparatus according to claim 10,
wherein the first sub information detection unit detects the first sub information simultaneously with the second sub information reading unit reading the second sub information, when the first sub information and the second sub information are recorded for a first predetermined unit of the plurality of predetermined units, and
wherein the testing unit detects, from the second sub information recorded for the first predetermined unit, the information associated with other first sub information recorded for a second predetermined unit, of the plurality of predetermined units, that is continuous to and follows the first predetermined unit in the direction of the spiral track.

13. An optical disc manufacturing apparatus for recording second sub information onto an optical disc,
wherein the optical disc includes first sub information and main information that is recorded by arranging concave or convex recording marks on a spiral track of the optical disc,
wherein the main information is recorded onto the optical disc in a plurality of predetermined units, each predetermined unit of the plurality of predetermined units including at least address information,
wherein the main information is for being decrypted using predetermined information,
wherein the optical disc manufacturing apparatus comprises:
a first sub information detection unit configured to detect the first sub information by detecting a shift of the concave or convex recording marks, a deformation of the concave or convex recording marks, or an alteration of a pattern of the concave or convex recording marks for each predetermined unit, of the plurality of predetermined units of the main information, that has been recorded by being divided in the plurality of predetermined units;
a first sub information storing unit configured to store the first sub information detected for each predetermined unit of the plurality of predetermined units; and
a second sub information recording unit configured to generate the second information by scrambling the predetermined information using the first sub information that is stored in the first sub information storing unit and that varies for each predetermined unit of the plurality of predetermined units, and to record the second sub information by controlling an intensity of laser light with which a reflective film formed on the concave or convex recording marks of the optical disc is irradiated,
wherein the first sub information detection unit detects the first sub information that varies for each predetermined unit of the plurality of predetermined units, and
wherein the second sub information recording unit generates the second sub information by scrambling the predetermined information using the first sub information recorded in a first predetermined unit of the plurality of predetermined units and records the second sub information in a second predetermined unit, of the plurality of predetermined units, that is continuous to and follows the first predetermined unit in the direction of the spiral track.

14. The optical disc manufacturing apparatus according to claim 13, wherein the second sub information is a signal generated by scrambling the predetermined information using a pseudo random number sequence generated using the first sub information as an initial value.

15. An optical disc having main information recorded thereon, the optical disc comprising:
a spiral track;
concave or convex recording marks on the spiral track; and
a reflective film formed on the concave or convex recording marks,
wherein the main information is for being decrypted using predetermined information,
wherein the main information is recorded onto the optical disc by arranging the concave or convex recording marks on the spiral track and forming the reflective film on the concave or convex recording marks,
wherein the main information is recorded onto the optical disc in a plurality of predetermined units, each predetermined unit of the plurality of predetermined units including at least address information and being continuously arranged with respect to another predetermined unit of the plurality predetermined units in a direction of the spiral track,
wherein the predetermined information is recorded based on first sub information and second sub information,
wherein the first sub information is generated by scrambling the predetermined information that is the same for each predetermined unit of the plurality of predetermined units using a predetermined value that varies for each predetermined unit of the plurality of predetermined units,
wherein the first sub information is recorded by being superimposed on the main information by shifting the concave or convex recording marks, deforming the concave or convex recording marks, or altering a pattern of the concave or convex recording marks,
wherein the second sub information is generated based on the predetermined value that varies for each predetermined unit of the plurality of predetermined units,
wherein the second sub information is recorded by being superimposed on the main information by changing a reflectivity of the reflective film formed on the concave or convex recording marks,
wherein the second sub information is recorded in a first predetermined unit of the plurality of predetermined units and the first sub information is recorded in a second predetermined unit, of the plurality of predetermined units, that is continuous to and follows the first predetermined unit in the direction of the spiral track, and
wherein the second sub information and the first sub information are generated and recorded in the first predetermined unit and the second predetermined unit, respectively, based on the same predetermined value.

16. The optical disc according to claim 15, wherein the first sub information is recorded and coded so as to enable a reading error of the first sub information to be detected.

17. The optical disc according to claim 15, wherein the first sub information includes information unique to a master for the optical disc.

18. The optical disc according to claim 15, wherein the second sub information is recorded after the optical disc is molded.

19. The optical disc according to claim 15, wherein the second sub information includes information unique to the optical disc.

* * * * *